(12) United States Patent
Hasegawa et al.

(10) Patent No.: US 11,967,160 B2
(45) Date of Patent: Apr. 23, 2024

(54) OWN POSITION INFERRING DEVICE

(71) Applicant: Mitsubishi Electric Corporation, Tokyo (JP)

(72) Inventors: Takefumi Hasegawa, Tokyo (JP); Tadahiko Urano, Tokyo (JP); Takuji Morimoto, Tokyo (JP); Kyosuke Konishi, Tokyo (JP); Kentaro Ishikawa, Tokyo (JP); Taku Umeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 67 days.

(21) Appl. No.: 17/897,632

(22) Filed: Aug. 29, 2022

(65) Prior Publication Data
US 2023/0105739 A1    Apr. 6, 2023

(30) Foreign Application Priority Data
Oct. 6, 2021 (JP) ................. 2021-164451

(51) Int. Cl.
*G06V 20/56* (2022.01)
*G06T 7/73* (2017.01)
*G06V 10/20* (2022.01)

(52) U.S. Cl.
CPC .............. *G06V 20/588* (2022.01); *G06T 7/73* (2017.01); *G06V 10/255* (2022.01)

(58) Field of Classification Search
CPC . G06T 2207/30244; G06T 2207/30256; G06T 7/73; G06T 7/75; G06T 2207/30248; G06T 2207/30252; G06V 10/255; G06V 20/588; G06V 20/56; G06V 20/58

USPC .......................... 348/148, 143; 382/103, 104
See application file for complete search history.

(56) References Cited

U.S. PATENT DOCUMENTS

2017/0227970 A1* 8/2017 Taguchi ................. G01S 19/485
2018/0202815 A1   7/2018 Asai
2020/0019792 A1   1/2020 Sano et al.

FOREIGN PATENT DOCUMENTS

JP    2018-84960 A    5/2018
JP    6477882 B2      3/2019
JP    6881464 B2      6/2021

OTHER PUBLICATIONS

Notification of Reasons for Refusal dated Sep. 27, 2022 from the Japanese Patent Office in Japanese Application No. 2021-164451.

* cited by examiner

*Primary Examiner* — Sherrie Hsia
(74) *Attorney, Agent, or Firm* — Sughrue Mion, PLLC; Richard C. Turner

(57) ABSTRACT

Conventionally, a method in which pieces of point group information for use in position matching between a white line position detected by an object detection sensor and a white line position on a map are extracted from the white line positions according to a travel environment, has not been taken into account. In the present disclosure, a point group extraction condition is changed according to change in the travel environment so that: a process of position matching that exhibits robustness with respect to change in the travel environment can be realized; and an own position and a white line position existing at a long distance from an own vehicle can be detected with high accuracy.

12 Claims, 24 Drawing Sheets

OWN POSITION INFERRING DEVICE

BACKGROUND OF THE INVENTION

1. Field of the Invention

The present disclosure relates to an own position inferring device.

2. Description of the Background Art

There is a conventional technology in which white line position information detected by an on-vehicle sensor such as a camera and road map information are combined so that a white line position existing at a long distance from an own vehicle is detected with high accuracy. As a method for combining white line position information and road map information, for example, a position matching method that involves matching between two positions which are white line position information detected by a camera and a demarcation line position (for example, a white line position on a map) acquired from map information about a region around an own vehicle position detected by the global positioning system (GPS) (global navigation satellite system (GNSS)) and an inertial measurement unit (IMU), has been known.

In general, an object detection sensor such as a camera can detect a white line position with a higher accuracy if the white line position exists at a shorter distance from an own vehicle. That is, in a region that ranges over a short distance from the own vehicle, detection can be performed such that the accuracy of a detected white line position is higher than the accuracy of a white line position on a map acquired by the GPS on the basis of the own vehicle position.

Meanwhile, in a region that ranges over a long distance from the own vehicle position, detection can be performed such that the accuracy of a white line position on the map is higher than the accuracy of a white line position detected by the camera since the accuracy of white line shape information acquired from map information is high. If, by making use of these two characteristics, a white line position on the map is matched with a white line position that exists at a short distance from the own vehicle and that has been detected by the object detection sensor, a white line position existing at a long distance from the own vehicle can be detected with high accuracy.

In addition, a method has been known in which an iterative closest point (ICP) algorithm is used to perform position matching between a plurality of pieces of point group information extracted from white line positions detected by an object detection sensor and a plurality of pieces of point group information extracted from white line positions on a map.

For example, Patent Document 1 discloses the following technology. That is, white line positions detected by a camera in a time sequence are accumulated. White line positions of white lines in the forms of straight lines are extracted from among the accumulated white line positions detected by the camera, and a position of a target (landmark) characterized by an angle formed by intersection of a plurality of the straight lines is detected. The position of the target detected on the basis of the white line positions detected by the camera, and a position of the target detected on the basis of white line positions on a map, are combined by using an ICP algorithm, whereby an own vehicle position on the map is inferred.

In addition, Patent Document 2 discloses the following technology. That is, the distance from a vehicle center position to a white line position detected by a camera, and the distance from the vehicle center position to a white line position on a map, are compared with each other. If the difference between the distances is large, determination as a target with a large error between relative positions is performed, and target position data is eliminated.

Patent Document 1: Japanese Patent No. 6477882
Patent Document 2: Japanese Patent No. 6881464

However, these technologies do not take into account a method in which pieces of point group information for use in position matching between a white line position detected by an object detection sensor and a white line position on a map, are extracted from the white line positions according to a travel environment. For example, the performance of detection by the camera is greatly dependent on a travel environment such as occlusion by another object or weather. Thus, the distance range from the own vehicle within which point group information can be extracted from a white line position with a high accuracy of position detection, changes according to the travel environment. Regarding the distance range from the own vehicle, a longer distance leads to increase in point group information and thus leads to a higher accuracy of position matching. However, if a point group with a low accuracy of position detection is included, the accuracy of position matching is low even when the point group information is increased.

Further, for example, if occlusion by another object causes masking and this causes a white line portion to be hidden, the accuracy of white line position detection by the camera in an image region around the white line position decreases. Thus, if point group information is extracted from a white line position detected by the camera in the image region, the accuracy of position matching decreases.

In this manner, the conventional own position inferring devices do not take into account extraction of point group information according to the travel environment. Therefore, drawbacks arise in that: the accuracy of position matching significantly decreases depending on the travel environment; and, in association with the decrease, the accuracy of detecting the position of the own vehicle (own position) and a white line position existing at a long distance from the own vehicle, decreases.

SUMMARY OF THE INVENTION

The present disclosure has been made to solve the above drawbacks, and an object of the present disclosure is to provide an own position inferring device in which a point group extraction condition is changed so that: a process of position matching that exhibits robustness with respect to change in a travel environment is realized; and an own position and a white line position existing at a long distance from an own vehicle can be detected with high accuracy.

An own position inferring device according to the present disclosure includes: a sensor white line detection unit configured to detect a white line position on the basis of an output from an on-vehicle sensor; a sensor point group extraction unit configured to extract first point group information from the white line position detected by the sensor white line detection unit; an own position detection unit configured to measure an own position on the basis of an output from a position measurement device; a map white line acquisition unit configured to acquire a white line position from map information about a region around the own position detected by the own position detection unit; a map point group extraction unit configured to extract second point group information from the white line position acquired from the map information by the map white line acquisition unit; a point group extraction condition changing unit configured to change a point group extraction condition for the sensor point group extraction unit and the map point group extraction unit; a white line position matching unit configured to perform position matching between the first point group information extracted by the sensor point group extraction unit and the second point group information extracted by the map white line acquisition unit; and an own position correction unit configured to correct the own position on the basis of a result of the position matching performed by the white line position matching unit.

In the own position inferring device according to the present disclosure, a method for extracting point group information is changed so that: a process of position matching that exhibits robustness with respect to change in a travel environment is realized; and an own position and a white line position existing at a long distance from an own vehicle can be detected with high accuracy.

DETAILED DESCRIPTION OF THE PREFERRED EMBODIMENTS OF THE INVENTION

Figure 1:
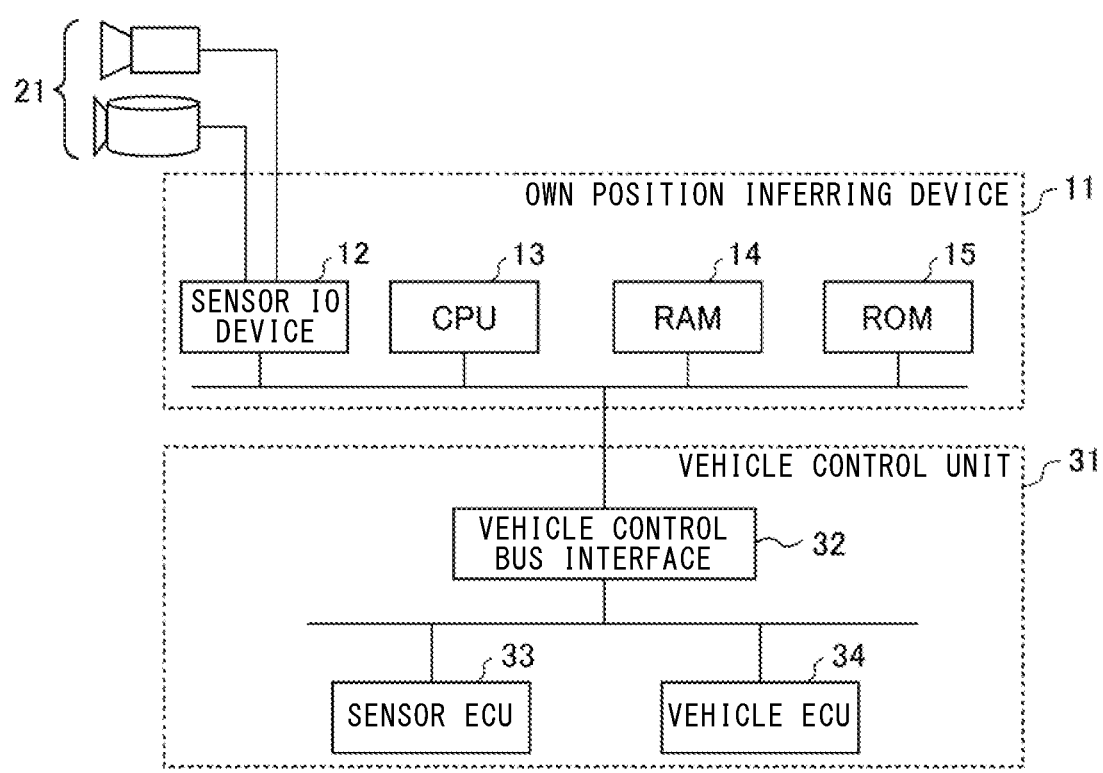
FIG. 1 is a hardware configuration diagram of own position inferring devices according to embodiments.

Hereinafter, own position inferring devices according to preferred embodiments of the present disclosure will be described with reference to the drawings. The same feature and corresponding parts are denoted by the same reference characters, and detailed descriptions thereof will be omitted. In the subsequent embodiments as well, redundant descriptions of components denoted by the same reference characters will be omitted.

First Embodiment

FIG. 1 is a hardware configuration diagram of an own position inferring device according to a first embodiment. FIG. 1 shows a configuration that is applied not only to the first embodiment but also to second to seventh embodiments described later. An own position inferring device 11 in FIG. 1 is composed of a sensor IO device 12, a central processing unit (CPU) 13, a random access memory (RAM) 14, a read only memory (ROM) 15, and the like. The own position inferring device 11 is connected via the sensor IO device 12 to sensor devices which are on-vehicle sensors 21. Examples of known sensor devices are: object detection sensors 211 such as a camera, a light detection and ranging (LiDAR) device, a millimeter wave sensor, and a sonar; position measurement devices 212 such as the GNSS/IMU; acceleration sensors; speed sensors; sensors for detecting a tilt such as a yaw rate; and the like. Sensor data of an own position of an own vehicle measured by an on-vehicle sensor 21 or sensor data of a white line position existing near the own vehicle measured by an on-vehicle sensor 21, is inputted to the own position inferring device 11.

The own position inferring device 11 is connected via a vehicle control bus interface 32 to a vehicle control unit 31. Consequently, vehicle control information such as information about a vehicle speed and a movement which are detected by the vehicle control unit 31, is outputted to the own position inferring device 11.

The vehicle control unit 31 is composed of a sensor ECU 33, a vehicle ECU 34, and the like. The vehicle control unit 31 performs monitoring for travel control of the own vehicle, and vehicle travel information (a vehicle speed/a steering angle) controlled by the vehicle ECU 34 is detected by the sensor ECU 33. The configuration of the own position inferring device 11 is not limited to the above configuration. For example, an incorporated device, an electronic control unit (ECU), an FPGA board, a GPU board, or the like may be used.

Figure 2:
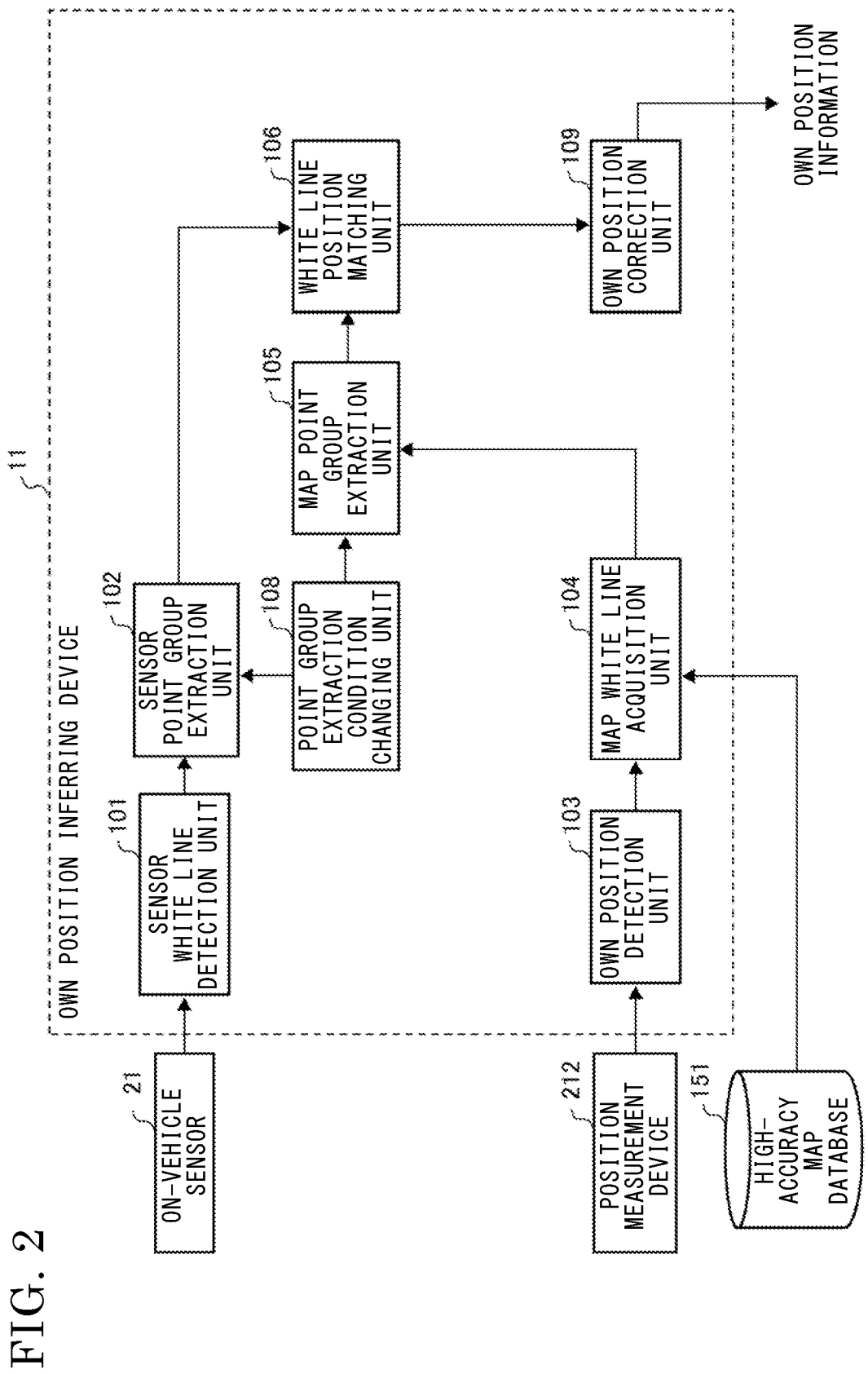
FIG. 2 is a functional configuration diagram of the own position inferring devices according to the embodiments.

FIG. 2 is a functional configuration diagram of the own position inferring device. FIG. 2 shows functions that are not limited to the first embodiment but are common to the first to seventh embodiments. Specifically, the own position inferring device is composed of: a sensor white line detection unit 101; a sensor point group extraction unit 102; an own position detection unit 103; a map white line acquisition unit 104; a map point group extraction unit 105 which extracts, from a white line position acquired from map information, point group information for use in a process of position matching; a white line position matching unit 106; a point group extraction condition changing unit 108; and an own position correction unit 109. The functions that are common to the first to seventh embodiments will be described in the first embodiment, and detailed descriptions thereof will be omitted in the other embodiments.

Figure 3:
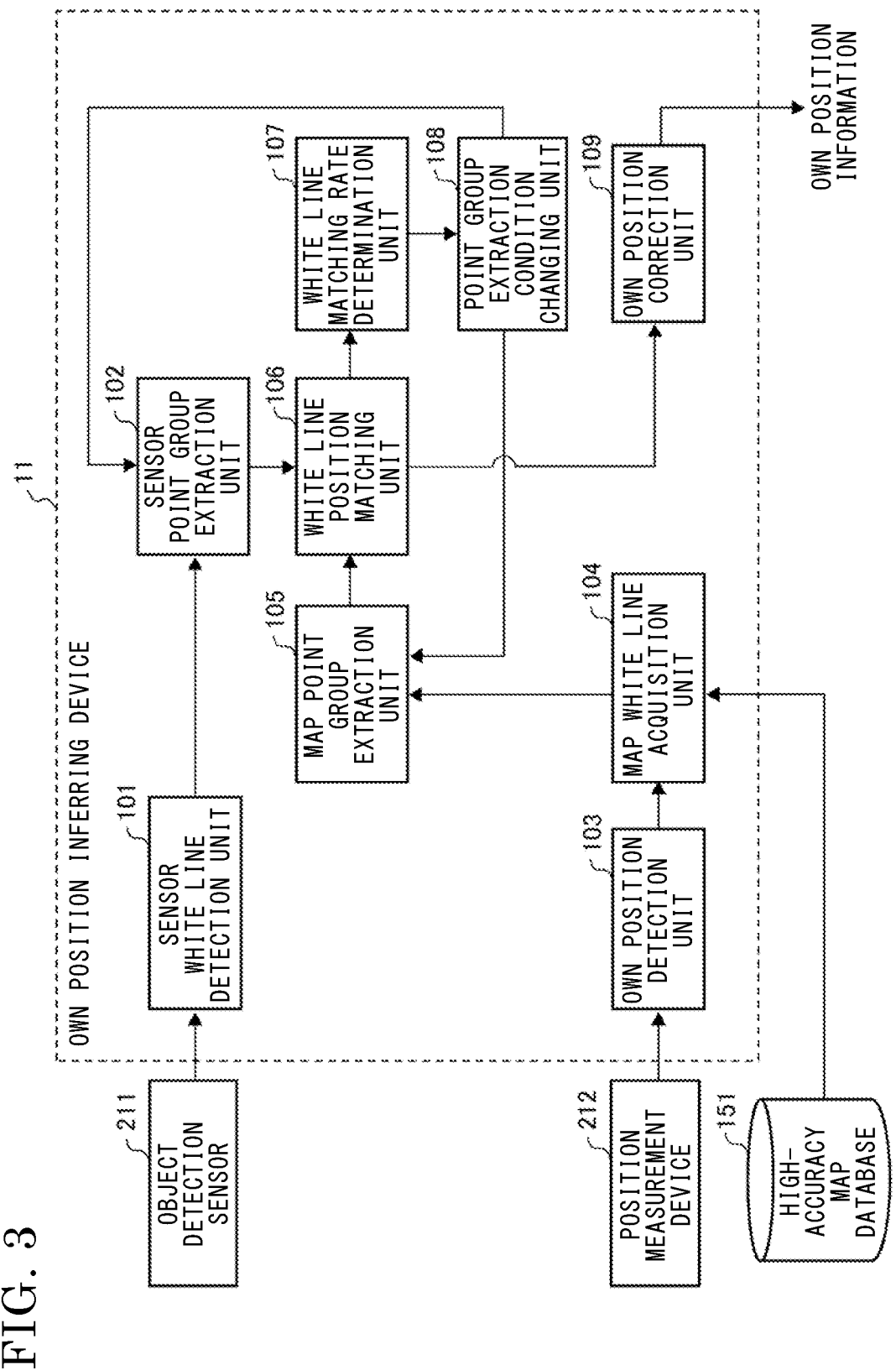
FIG. 3 is a functional configuration diagram of an own position inferring device according to a first embodiment.

It is noted that, regarding determination of a condition to be changed by the point group extraction condition changing unit 108, there are differences in the manner of detection and a determination target among the first to seventh embodiments. In the first embodiment, a point group extraction condition is changed through determination as to a white line matching rate, as shown in FIG. 3. In the second to seventh embodiments described later, there are differences in the manner of detection or a determination target for changing the point group extraction condition, and thus description will be given focusing on the features that differ.

The sensor white line detection unit 101 in FIG. 2 and FIG. 3 is a unit for detecting a white line existing near the vehicle by using the on-vehicle sensor 21. A white line position on a road is detected by extracting a white line portion from: pixel values in an image taken by, for example, a camera among the above object detection sensors 211; or reflection intensity information about a point group measured by, for example, a LiDAR device among the above object detection sensors 211. For a rib-type white line, the white line position thereof on the road is detected by extracting a rib portion from reflection intensity information obtained by a millimeter wave sensor.

Figure 4:
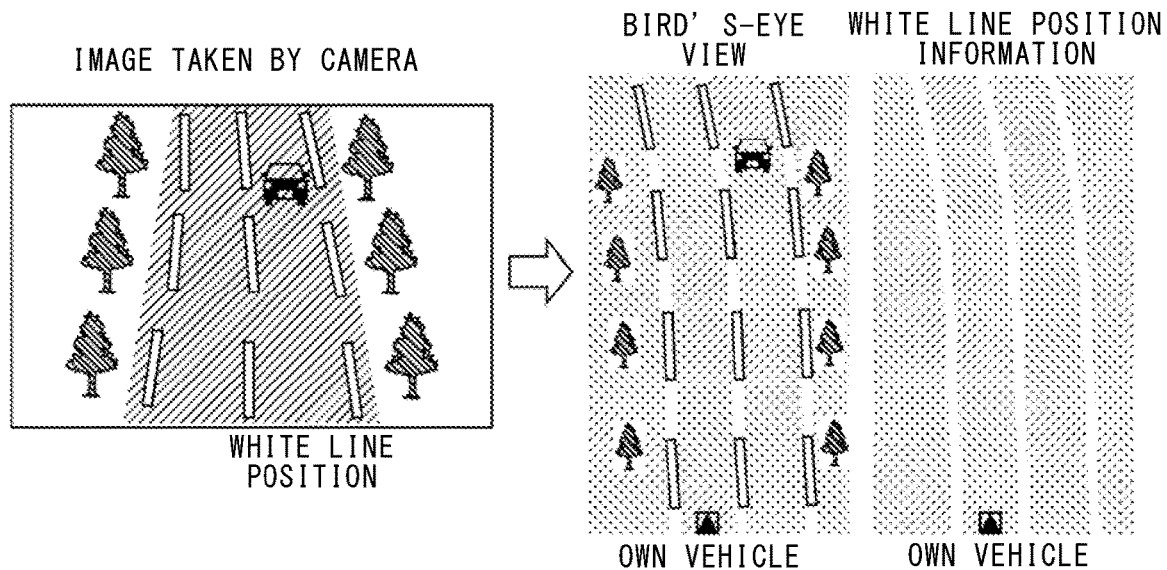
FIG. 4 is a diagram for explaining an example of detecting white line positions, in the own position inferring device according to the first embodiment.

FIG. 4 shows an example of detecting white line positions by using a camera. In white line position detection, white line portions on a road are extracted from pixel values in an image taken by the camera. Then, the image taken by the camera is subjected to coordinate conversion so as to be seen from above in a bird's-eye view. At this time, the white line positions are also subjected to coordinate conversion, to be converted into white line positions for a two-dimensional planar coordinate system in a vehicle advancement direction and a vehicle lateral direction. A white line on the road may be white portions that are successive in the form of a dotted line. In this case, the curved line shape of a white line obtained by connecting together the white line positions that are in the form of a dotted line is calculated as white line position information. The curved line shape of the white line may be converted into three-dimensional curve information having four parameters. The conversion into the three-dimensional curve information makes it possible to detect a white line position in the vehicle lateral direction with respect to an arbitrarily-selected distance in the vehicle advancement direction. The four parameters refer to parameters a, b, c, and d in a cubic curve expression which is $Y=ax^3+bx^2+cx+d$. The four parameters, and the relative positions of a vehicle and a white line, are in the following relationship. That is, "d" represents the distance in the vehicle direction between the vehicle and the white line, "c" represents the angle between the vehicle advancement direction and the direction of the white line, and "a" and "b" each represent a white line curvature.

Figure 5:
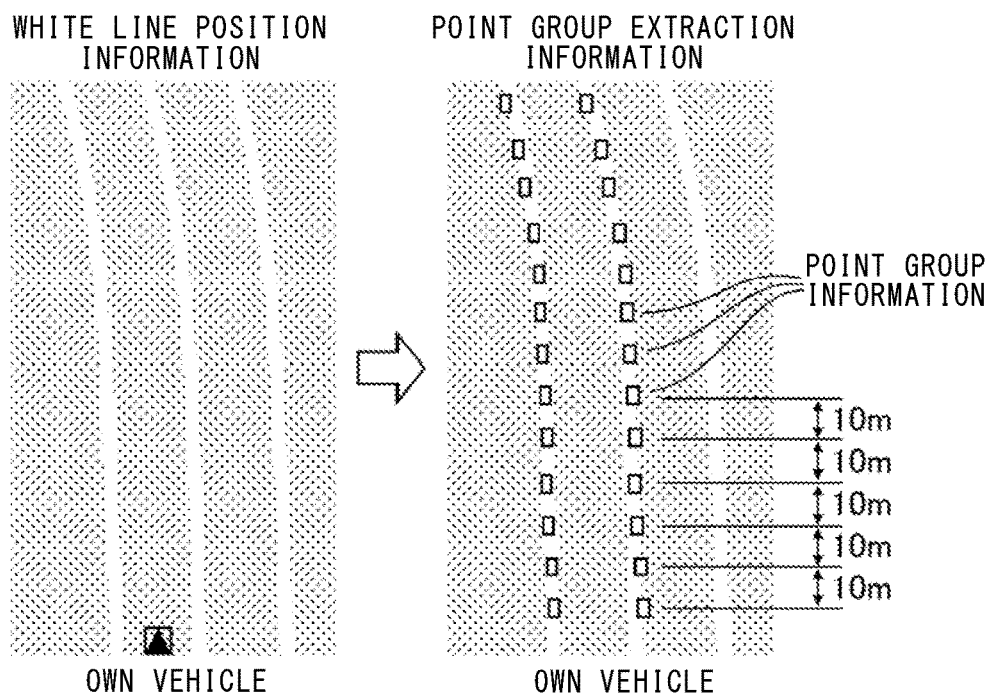
FIG. 5 is a diagram for explaining an example of extracting pieces of point group information from the white line positions, in the own position inferring device according to the first embodiment.

The sensor point group extraction unit 102 in FIG. 2 and FIG. 3 is a unit for extracting point group information for use in white line position matching, from the white line position detected by the sensor white line detection unit 101. FIG. 5 shows an example of a method for extracting point group information. In FIG. 5, point group information is acquired from each white line position at each interval of 10 m in the vehicle advancement direction, with the position of the own vehicle (own position) being a reference position. If the white line position detected by the sensor white line detection unit 101 is expressed with a three-dimensional curve, a numerical value obtained at each interval of 10 m in the advancement direction is substituted in the three-dimensional curve, and point group position information (two-dimensional coordinate position based on position information obtained at each interval of 10 m in the vehicle advancement direction and position information in the vehicle lateral direction) is acquired.

Here, regarding a white line position detected by the object detection sensor 211, the accuracy of detecting the white line position is generally higher if the white line position exists at a shorter distance from the own vehicle. Considering this, the sensor point group extraction unit 102 extracts point group information from a white line position that exists at a short distance from the own vehicle. The distance within which point group information is extracted from the white line position is changed by the point group extraction condition changing unit 108 according to a vehicle travel environment.

The own position detection unit 103 in FIG. 2 and FIG. 3 is a unit for detecting an own position by using the position measurement device 212 mounted to the vehicle. The own position may be detected without using the GNSS/IMU. Specifically, the own position may be detected by acquiring information about a vehicle speed or a steering angle that can be acquired from the vehicle.

Figure 6:
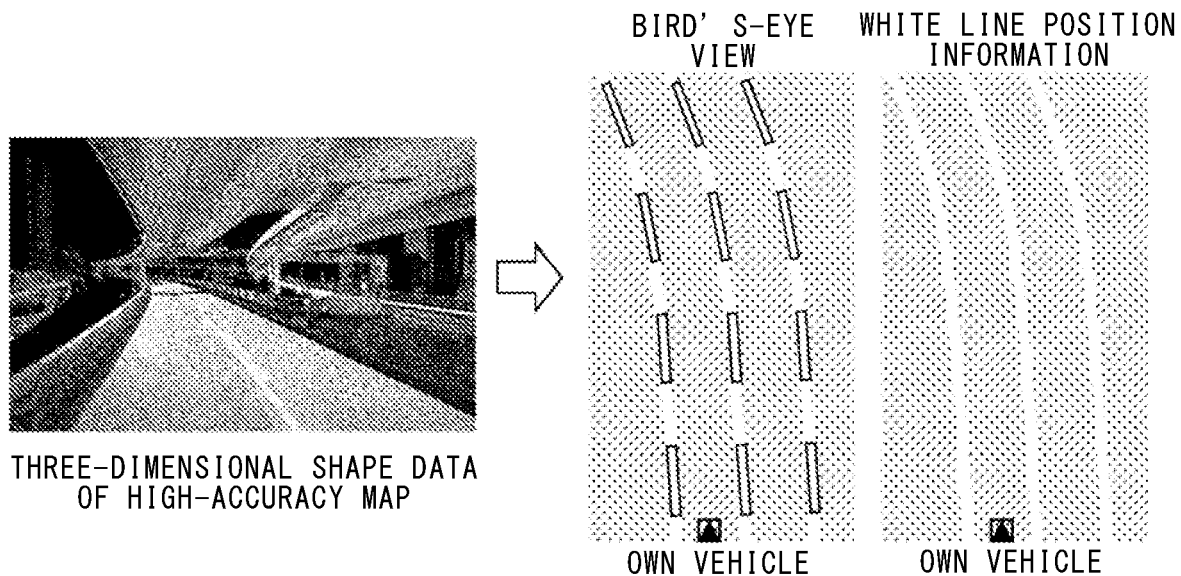
FIG. 6 is a diagram for explaining a method for detecting white line positions from map information, in the own position inferring device according to the first embodiment.

The map white line acquisition unit 104 in FIG. 2 and FIG. 3 is a unit for referring to the own position detected by the own position detection unit 103, to acquire white line information from map information, about a region around the own position, which is stored in a high-accuracy map database (DB) 151. FIG. 6 shows a method for detecting white line positions from map information. In high-accuracy map information such as one shown on the left side of FIG.

6, a white line position is stored as three-dimensional shape data. The three-dimensional shape data may be directly used as white line position data for use in a process of white line position matching. Meanwhile, in order to reduce the calculation process amount of the process of position matching, the white line position data (the left side of FIG. 6) having a three-dimensional shape may be adapted, as shown in FIG. 6, to a bird's-eye view (the right side of FIG. 6) from which height differences of road surfaces are excluded so that the white line position data is projected on a two-dimensional planar coordinate system in the vehicle advancement direction and the vehicle lateral direction, to be converted into white line position data expressed with two-dimensional coordinates.

Figure 7:
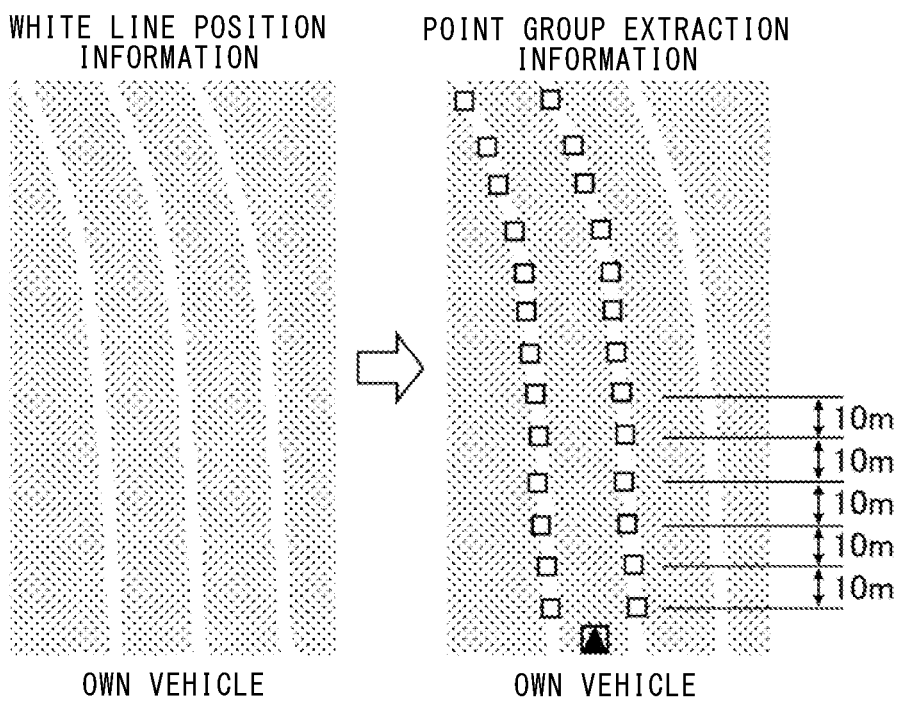
FIG. 7 is a diagram for explaining an example of extracting pieces of point group information from the white line positions, in the own position inferring device according to the first embodiment.

The map point group extraction unit 105 in FIG. 2 and FIG. 3 is a unit for extracting point group information from the white line position on the map acquired by the map white line acquisition unit 104. FIG. 7 shows an example of a method for extracting point group information. In FIG. 7, in the same manner as in the sensor point group extraction unit 102, point group information is acquired from each white line position on the map at each interval of 10 m in the advancement direction, with the own position of the own vehicle on the map being a reference position. If the white line position acquired by the map white line acquisition unit 104 is expressed with a three-dimensional curve, a numerical value obtained at each interval of 10 m in the advancement direction is substituted in the three-dimensional curve, whereby point group position information (a two-dimensional coordinate position based on position information obtained at each interval of 10 m in the vehicle advancement direction and position information in the vehicle lateral direction) is acquired. It is noted that, in the same manner as in the sensor point group extraction unit 102, the distance within which point group information is extracted from the white line position is changed by the point group extraction condition changing unit 108. It is noted that, in the first embodiment, the point group extraction condition is changed on the basis of a result from a white line matching rate determination unit described later.

Figure 8:
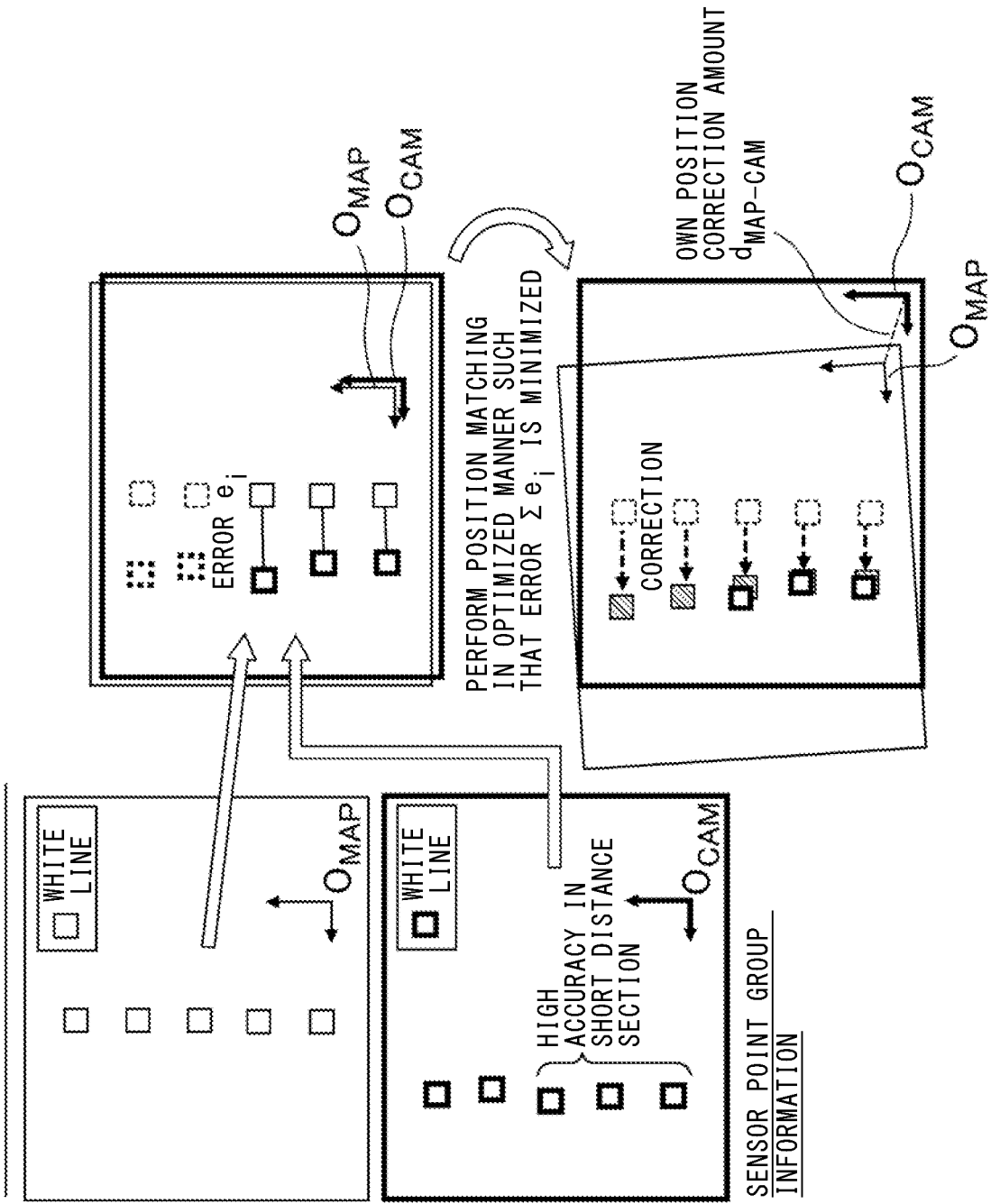
FIG. 8 is a diagram for explaining a process of position matching performed by a white line position matching unit of the own position inferring device according to the first embodiment.

The white line position matching unit 106 in FIG. 2 and FIG. 3 is a unit for performing position matching between the sensor point group information extracted by the sensor point group extraction unit 102 and the map point group information extracted by the map point group extraction unit 105. FIG. 8 shows a process of position matching between the sensor point group information and the map point group information. During the process of position matching in FIG. 8, the correspondence relationship between the sensor point group information and the map point group information is searched, and the position of the entirety of a coordinate system ($O_{MAP}$) of the map point group information is changed by an own position correction amount ($d_{MAP-CAM}$) such that the distance between the point groups in a short distance section that enables acquisition of sensor point group information with high accuracy, becomes shortest (such that the total value of errors $e_i$ becomes smallest). An ICP algorithm or the like may be used as a position matching algorithm that minimizes the total value of the errors $e_i$ in FIG. 8.

It is noted that calculation for the minimization may involve: dividing a parameter for position matching into a rotation matrix and a translation vector; converting a coordinate system ($O_{CAM}$) of the sensor point group information and the coordinate system ($O_{MAP}$) of the map point group information into coordinate systems with respective centroid positions being origins; referring to dispersion information about each point group, to calculate only a rotation matrix for position matching at first; and then, calculate a translation vector, whereby the load of calculation for the minimization is decreased.

Figure 9:
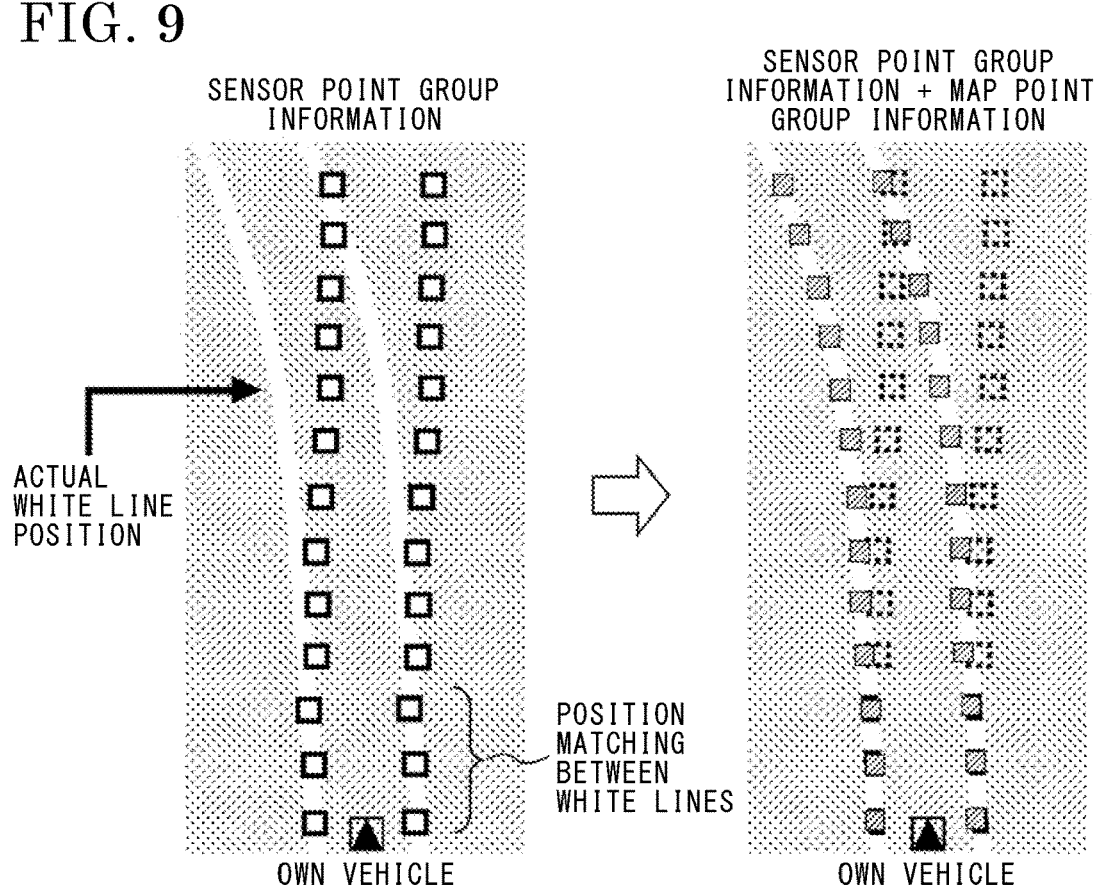
FIG. 9 is a diagram for explaining an effect of the process of position matching performed by the white line position matching unit in the first embodiment.

FIG. 9 shows an effect of increasing the accuracy of distant white line positions through white line position matching. The point group information about each white line shape acquired from the map point group information is matched with the sensor point group information about the corresponding white line detected by the object detection sensor 211, the sensor point group information serving as a reference. Consequently, the white line shape on the map compensates for a distant white line position that is detected with low accuracy by the object detection sensor 211. Therefore, the distant white line position can be detected with high accuracy.

Figure 10:
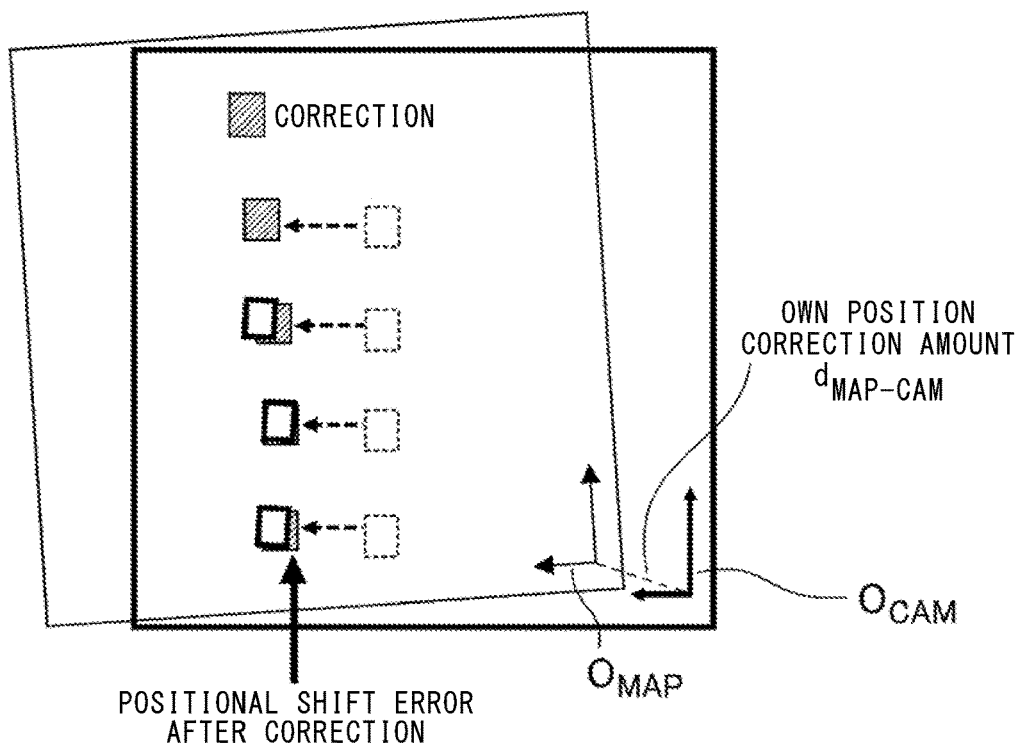
FIG. 10 is a diagram for explaining an example of determining a white line matching rate, in the own position inferring device according to the first embodiment.

A white line matching rate determination unit 107 in FIG. 3 calculates a matching rate between the sensor point group information and the map point group information which have been subjected to the position matching by the white line position matching unit 106, and determines whether the matching rate is high or low. FIG. 10 shows an example of the matching rate determination. In FIG. 10, the total value of positional shift errors between the sensor point group and the map point group after the process of position matching is calculated. The calculated total value of the positional shift errors and a predetermined threshold value are compared with each other, and determination is performed as to whether the white line matching rate is high or low. Here, the predetermined threshold value may be set such that the average positional shift error between the point groups becomes equal to or smaller than 10 cm.

Figure 11:
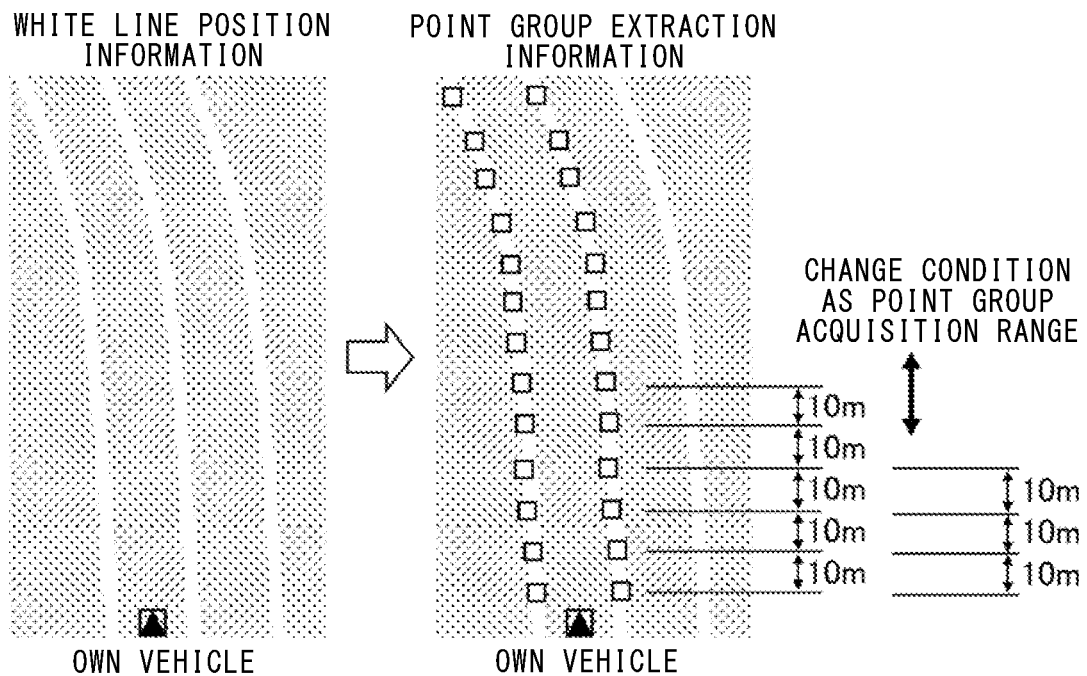
FIG. 11 is a diagram for explaining an example of changing a point group extraction condition, in the own position inferring device according to the first embodiment.
Figure 12:
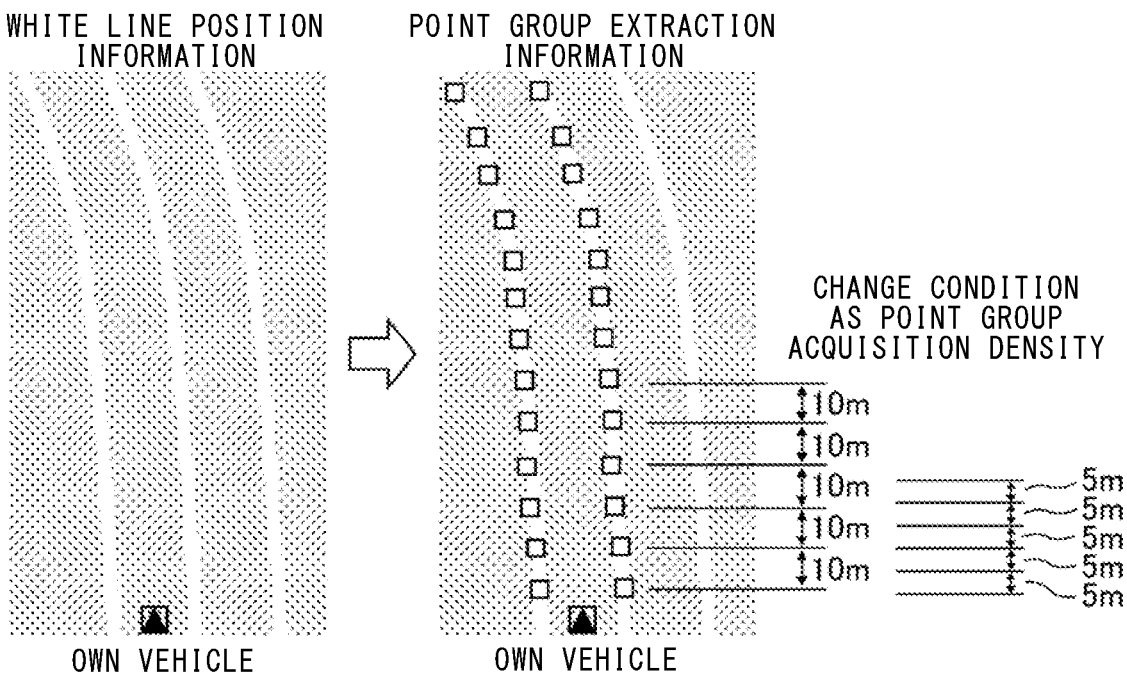
FIG. 12 is a diagram for explaining an example of changing the point group extraction condition, in the own position inferring device according to the first embodiment.

The point group extraction condition changing unit 108 in FIG. 2 and FIG. 3 changes a point group information extraction condition. In the first embodiment, the point group extraction condition changing unit 108 changes, according to a result of the determination performed by the white line matching rate determination unit 107, a condition of extracting pieces of point group information from the sensor white line position and the map white line position. FIG. 11 and FIG. 12 each show an example of the point group information extraction condition. FIG. 11 shows an example in which a condition as the distance range from the own vehicle within which point group information is extracted, is changed. In the example in FIG. 11, the distance range for point group acquisition is narrowed from 50 m to 30 m. Specifically, in a process of widening and narrowing the distance range, the distance range is widened if the matching rate obtained by the white line matching rate determination unit 107 is high, and meanwhile, the distance range is narrowed if the matching rate is low.

FIG. 12 shows an example in which the density at which point group information is extracted, is changed. In this example, a change is made from point group extraction at each interval of 10 m to point group extraction at each interval of 5 m. Specifics are as follows. The total number of pieces of point group information decreases if the distance range within which point group information is extracted is narrowed. Considering this, if the distance range is narrowed, the density at which point group information is acquired may be changed.

If the white line matching rate is low, there is a high probability that the accuracy of white line position detection by the object detection sensor 211 has decreased. Considering this, the point group extraction condition is changed so as to narrow the distance range and change the density at which point group information is extracted. Consequently, point group information that is detected with a decreased accuracy can be eliminated, and the process of position matching using sensor point groups can be performed according to the travel environment.

If the matching rate obtained by the white line matching rate determination unit 107 is high, the own position correction unit 109 refers to the movement amount d-mc calculated by the white line position matching unit 106 through position matching between the white lines, to correct the own position detected by the own position detection unit 103. Further, the own position correction unit 109 outputs own position information.

Figure 13:
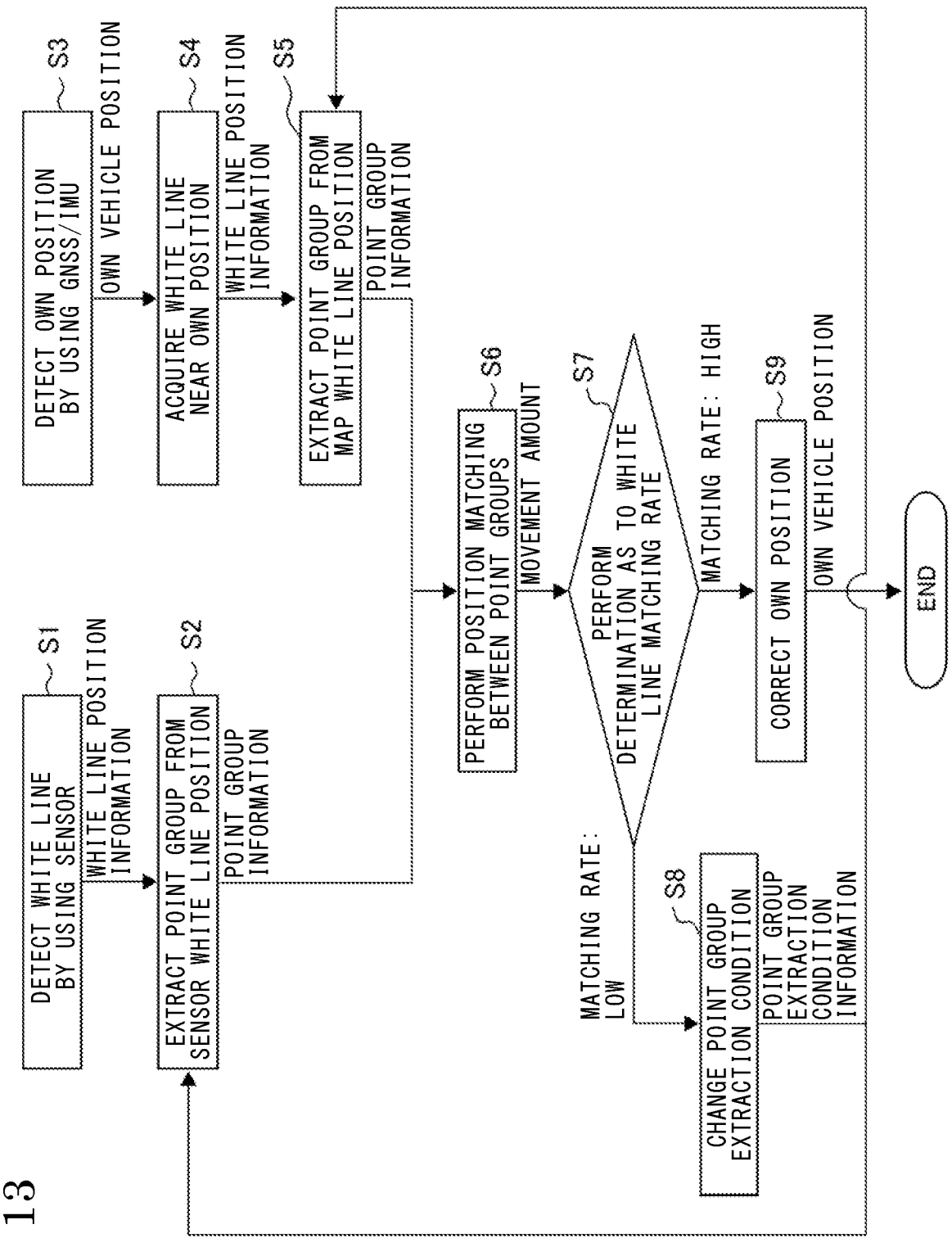
FIG. 13 is a flowchart for explaining an operation of the own position inferring device according to the first embodiment.

A flowchart of the first embodiment shown in FIG. 13 will be described.

(1) The sensor white line detection unit 101 detects a white line position on a road surface on the basis of measurement information from the object detection sensor 211 (step S1).

(2) The sensor point group extraction unit 102 extracts sensor point group information from the white line position detected in step S1 (step S2). In the sensor point group information extraction, the sensor point group information is extracted from the white line position according to a predetermined initial condition. An example of the initial condition is a distance range within which point group information is extracted from the white line position. As the initial condition, the distance range may be set to 50 m. Another example of the initial condition is an interval at which point group information is extracted from the white line position. As the initial condition, the interval may be set to 10 m so that sensor point group information is extracted from the white line position at each interval of 10 m.

(3) The own position detection unit 103 detects an own position of the own vehicle by using the position measurement device 212 such as the GNSS/IMU (step S3).

(4) The map white line acquisition unit 104 acquires, from map information, a white line position on the road existing near the own position detected in step S3 (step S4).

(5) The map point group extraction unit 105 extracts map point group information from the white line position acquired in step S4. An initial condition for the map point group information may be set to take the same condition value as that for the sensor point group information described in step S2 (step S5).

(6) The white line position matching unit 106 performs position matching between the sensor point group information extracted in step S2 and the map point group information extracted in step S5. A movement amount $d_{MAP-CAM}$, for positions in the map point group information, with which the distances between corresponding points in the sensor point group information and the map point group information become shortest, is calculated, and the point group is moved (step S6).

(7) The white line matching rate determination unit 107 performs determination as to a matching rate between the sensor point group information and the map point group information which have been subjected to the position matching (step S7). A method for the determination may be as follows. That is, the distances between the corresponding points at point group positions in the sensor point group information and point group positions in the map point group information after position matching, are added up. If the total distance is longer than a predetermined threshold value, the matching rate is determined to be low. Meanwhile, if the total distance is shorter than the predetermined threshold value, the matching rate is determined to be high. If the matching rate is low, step S8 is performed, and, if the matching rate is high, step S9 is performed.

(8) If the matching rate is low, the point group extraction condition changing unit 108 changes the point group information extraction condition for step S2 and step S5 (step S8). As the point group information extraction condition, a condition value such as the distance range within which pieces of point group information are extracted from the white line positions or the interval at which pieces of point group information are extracted from the white line positions, is changed. Thereafter, the processes in steps S2, S5, S6, S7, and S8 are repetitively performed until a result of the determination performed in step S7 indicates that the white line matching rate is high.

(9) If the matching rate is high, the own position correction unit 109 refers to the movement amount d-mc calculated in step S6 at the time of the point group position matching, to correct the own position of the own vehicle (step S9).

In this manner, the processes described above are performed in the first embodiment. Consequently, the condition of extracting pieces of point group information for use in the process of position matching between the white line position from the object detection sensor 211 and the white line position on the map from the own position detection unit is changed according to a result of the determination performed by the white line matching rate determination unit 107. Thus, a process of position matching that exhibits robustness with respect to change in a travel environment can be realized, and the own position of the vehicle and a white line position existing at a long distance from the vehicle can be detected with high accuracy.

Second Embodiment

In the present embodiment, the point group information extraction condition is changed when there is a significant change in measurement data from the on-vehicle sensor. It is highly probable that the travel environment of automobiles continues to be the same travel environment for a certain period. Considering this, if there is no significant change in measurement data from the on-vehicle sensor, the point group information extraction condition is not changed. This makes it possible to provide an own position inferring device 11 in which the calculation process amount is reduced.

Figure 14:
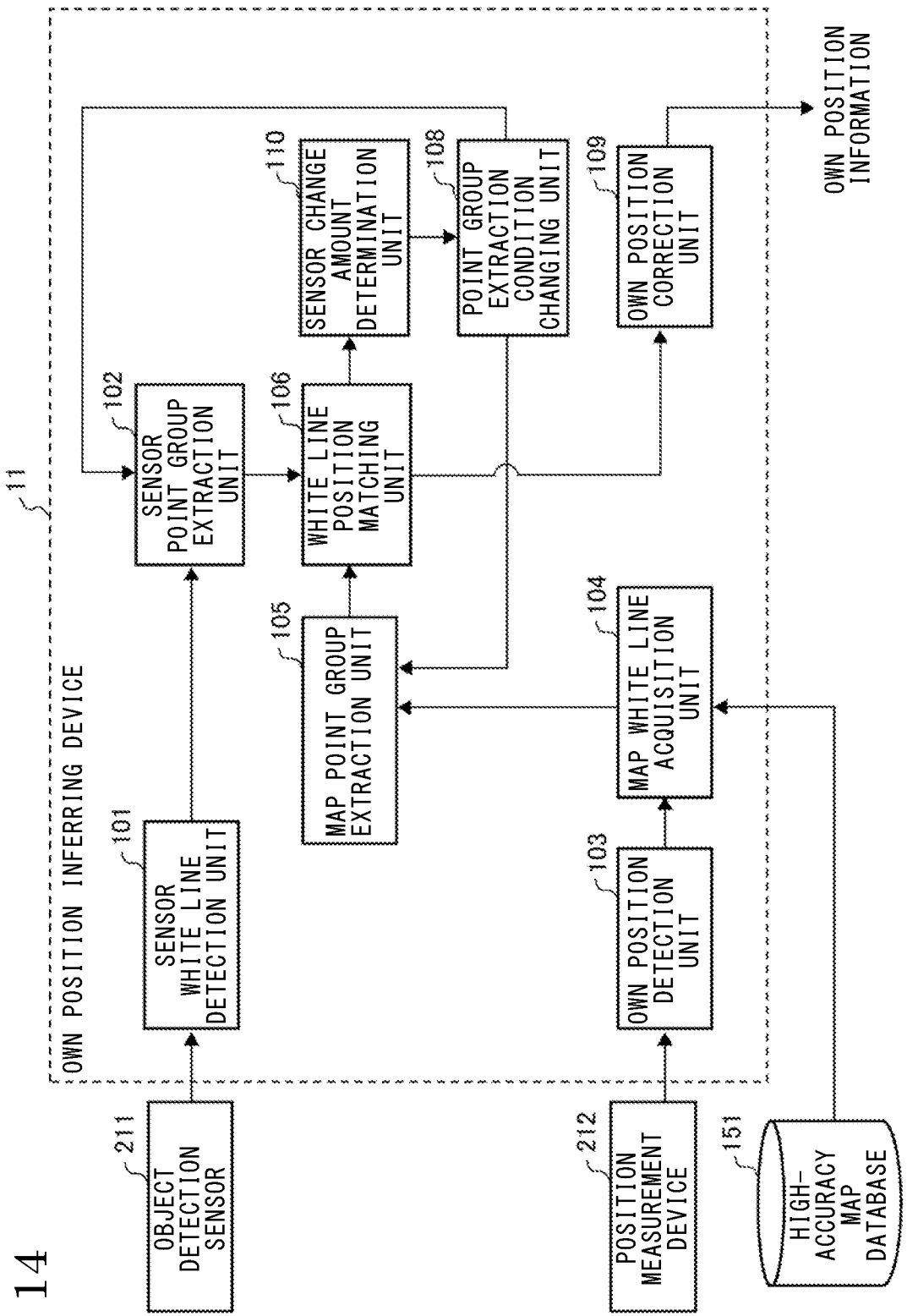
FIG. 14 is a functional configuration diagram of an own position inferring device according to a second embodiment.

FIG. 14 shows a functional configuration diagram of the second embodiment. A difference in configuration from the first embodiment is that the unit that forms the basis of determination to change the point group extraction condition is changed from the white line matching rate determination unit 107 to a sensor change amount determination unit 110.

The sensor change amount determination unit 110 determines whether the amount of change in measurement data sensed by the object detection sensor 211 is large or small. For example, in the case of using a camera as the object detection sensor 211, images taken by the camera are accumulated in a time sequence, and a pixel difference value between taken images is calculated at each time point in the time sequence. If the average value among the pixel difference values is larger than a predetermined threshold value, the amount of change in the measurement data is determined to be large. In contrast, if the average value is smaller than the predetermined threshold value, the amount of change in the measurement data is determined to be small.

Figure 15:
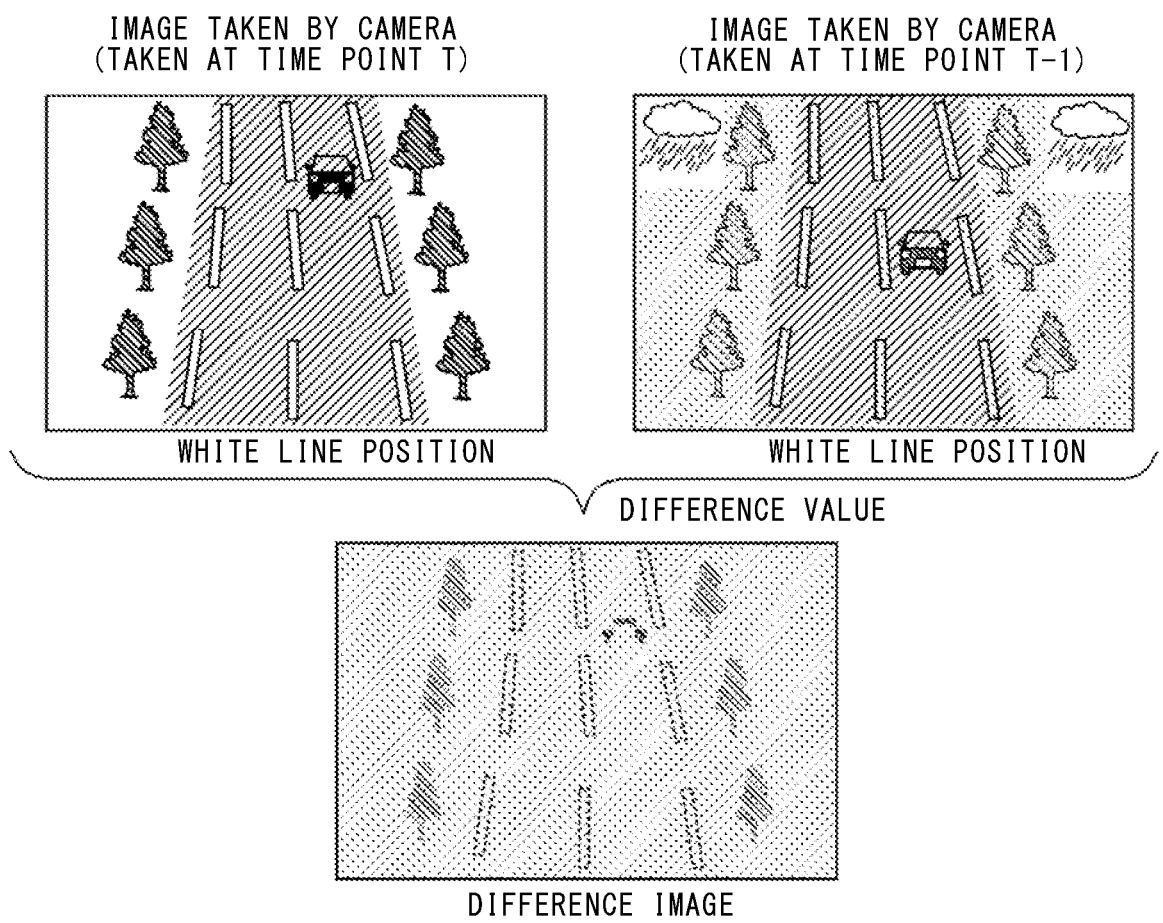
FIG. 15 is a diagram for explaining a sensor change amount in the own position inferring device according to the second embodiment.

For example, the predetermined threshold value to be compared with the pixel difference value may be set to 80 out of 256 levels of measurement data. FIG. 15 shows a difference image obtained by subtracting an image taken at a time point T-1 from an image taken at a time point T. The difference image has different pixel values at different pixel positions. Thus, the average value of pixel difference values is calculated and is compared with the predetermined threshold value.

If the amount of change in the measurement data is determined to be large, the point group extraction condition changing unit 108 changes the condition of extracting pieces of point group information from the white line positions. An example of a method for the change is as shown in FIG. 15. That is, if the pixel values in an image taken by the camera are changed to be darkened on the whole, i.e., if the average value of the pixel difference values is smaller than the predetermined threshold value, the distance range within which pieces of point group information are acquired from the white line positions is narrowed. In contrast, if the pixel values are changed to be brightened on the whole, the distance range within which pieces of point group information are acquired from the white line positions may be widened.

Figure 16:
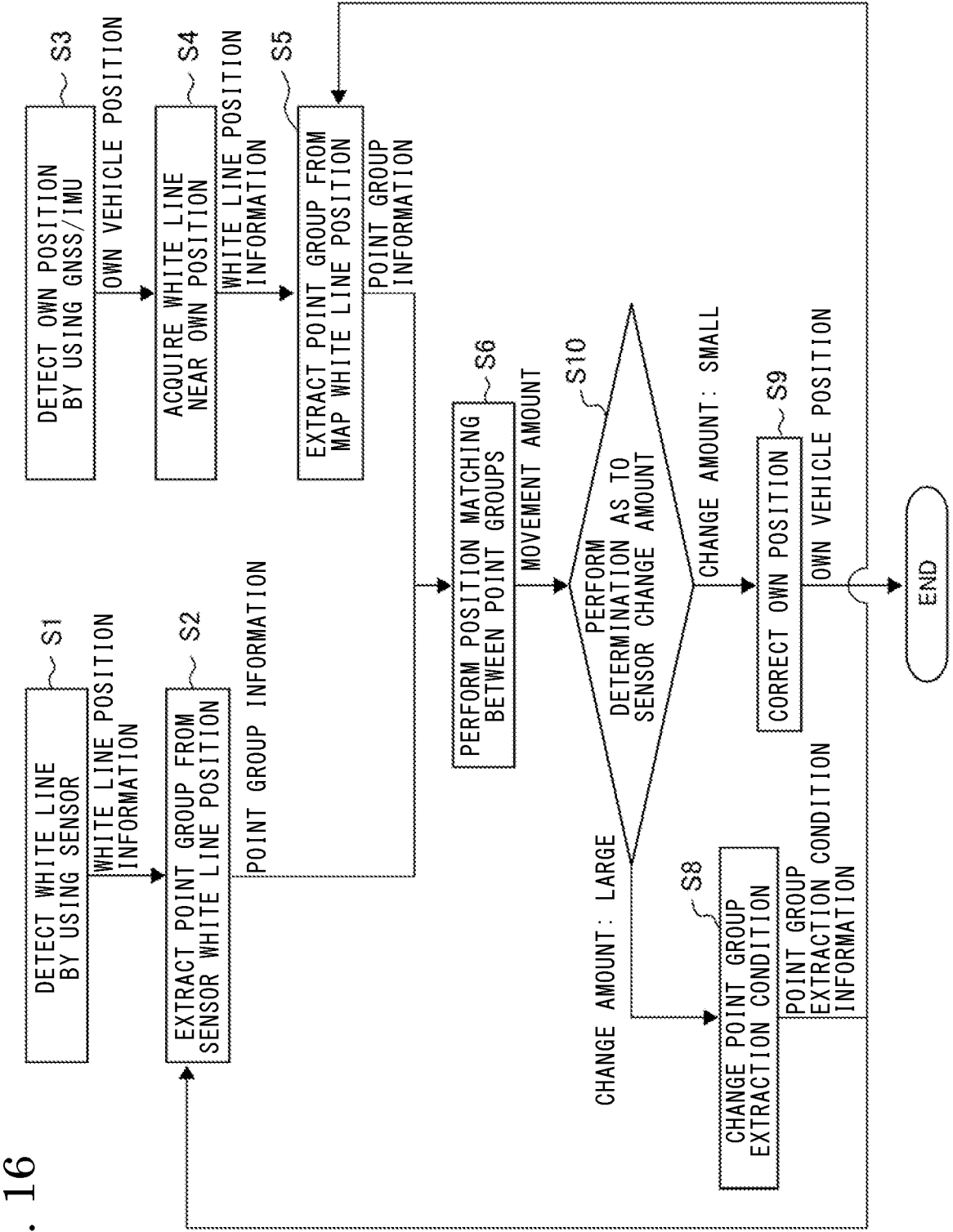
FIG. 16 is a flowchart for explaining an operation of the own position inferring device according to the second embodiment.

FIG. 16 shows a flowchart of the second embodiment. The processes other than the process of determination as to the sensor change amount described in step S10 in the second embodiment are the same as the processes in the first embodiment, and thus descriptions thereof will be omitted.

The sensor change amount determination unit 110 accumulates, in a time sequence, pieces of measurement data measured by the object detection sensor 211 and calculates a difference value between the pieces of data measured at different time points (step S10). If the difference value is large, the sensor change amount is determined to be large, and step S8 is performed. Meanwhile, if the difference value is small, the sensor change amount is determined to be small, and step S9 is performed.

Consequently, the condition of extracting pieces of point group information for use in the process of position matching between the white line position from the object detection sensor 211 and the white line position on the map from the own position detection unit is changed according to the output from the sensor change amount determination unit 110. Thus, a process of position matching that exhibits robustness with respect to change in a travel environment is realized, and the own position of the own vehicle and a white line position existing at a long distance from the own vehicle can be detected with high accuracy.

Figure 17:
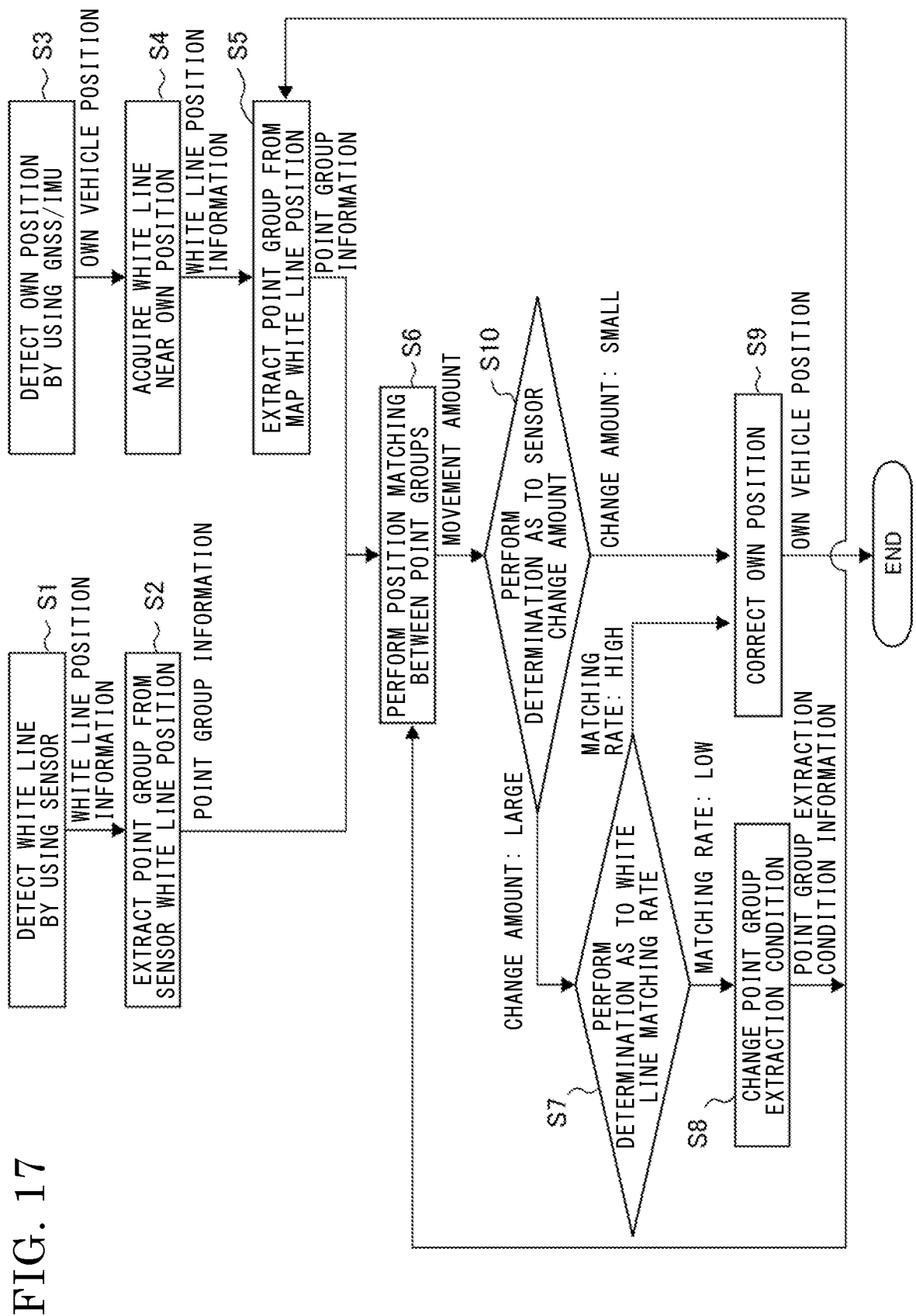
FIG. 17 is a flowchart for explaining another operation of the own position inferring device according to the second embodiment.

Although the above second embodiment has given description about an exemplary functional configuration diagram in which the sensor change amount determination unit 110 is added instead of the white line matching rate determination unit 107 in the first embodiment, both the white line matching rate determination unit 107 and the sensor change amount determination unit 110 may be provided. FIG. 17 shows a flowchart in this case.

In FIG. 17, a sensor change amount is calculated (step S10). If the sensor change amount is determined to be large, the process of determination as to the white line matching rate is performed (step S7). The process of determination is the same as that described in the first embodiment. That is, the white line matching rate determination unit 107 performs determination as to the matching rate between the sensor point group information and the map point group information which have been subjected to the position matching (step S7). If the matching rate is low, step S8 is performed, and, if the matching rate is high, step S9 is performed. Meanwhile, if the sensor change amount is determined to be small, step S9 is performed. Consequently, if the sensor change amount is small, the process of determination as to the white line matching rate is not performed. This makes it possible to provide an own position inferring device in which the calculation process amount is reduced.

In this manner, the processes described above are performed in the second embodiment. Consequently, the condition of extracting pieces of point group information for use in the process of position matching between the white line position from the object detection sensor 211 and the white line position on the map from the own position detection unit is changed according to a result of the determination performed by the sensor change amount determination unit 110. Thus, a process of position matching that exhibits robustness with respect to change in a travel environment can be realized, and the own position of the vehicle and a white line position existing at a long distance from the vehicle can be detected with high accuracy.

Third Embodiment

In the present embodiment, the condition of extracting pieces of point group information from the white line positions is changed according to the type of the white line. Examples of the type of the white line are a white line in the form of a dotted line, a white line in the form of a single line, a white line in the forms of double lines, a white line with arrow feather marks, a lane-change prohibiting white line (yellow line), and the like. The accuracy of detecting the white line position of a white line with arrow feather marks or the like is lower than the accuracy of detecting the white line position of a white line in the form of a dotted line, a single line, or the like. Considering this, the point group information extraction condition is changed, and only point group information that is detected with high accuracy is extracted.

Figure 18:
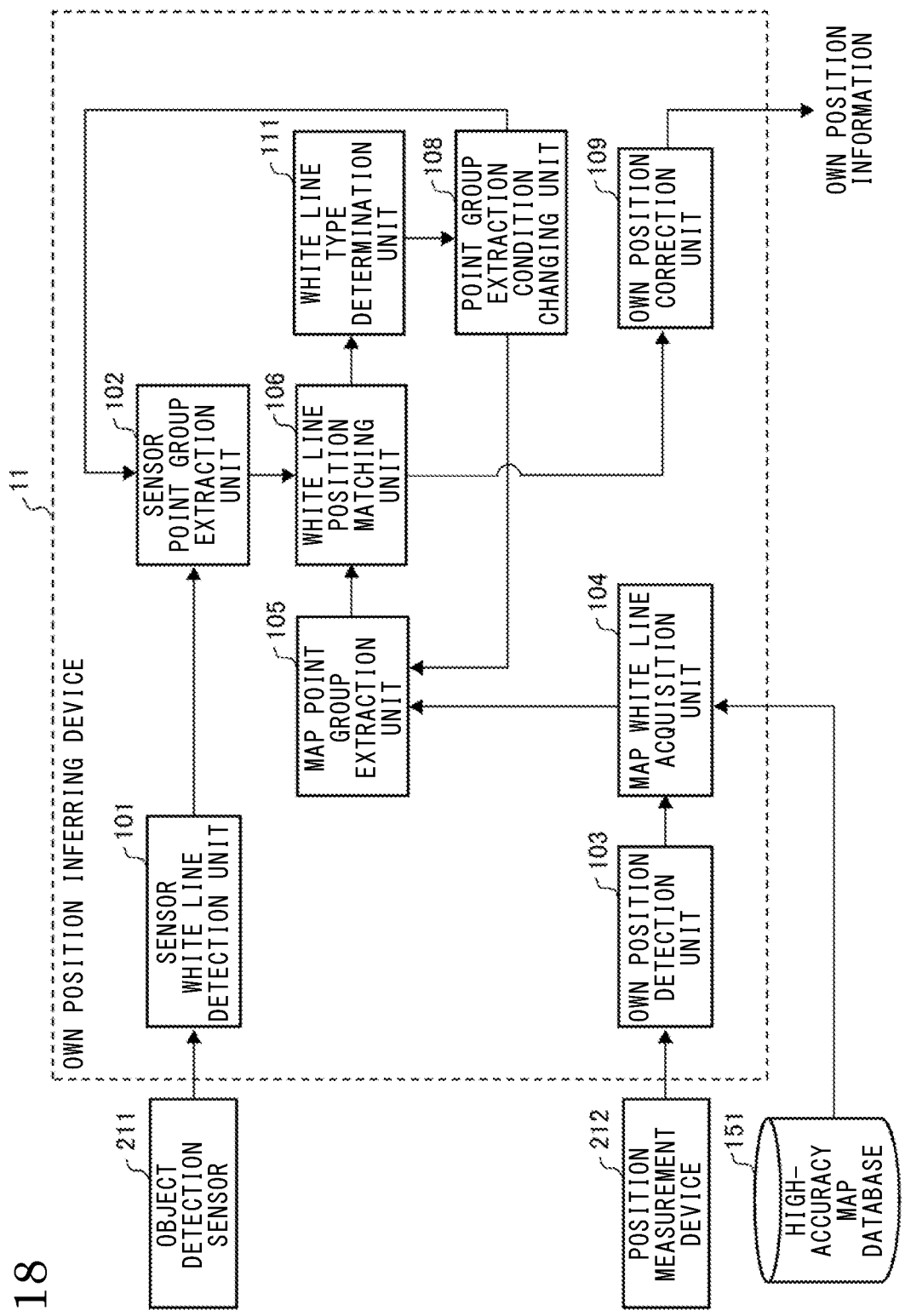
FIG. 18 is a functional configuration diagram of an own position inferring device according to a third embodiment.

FIG. 18 shows a functional configuration diagram of the third embodiment. A difference in configuration from the first embodiment is that the unit that forms the basis of determination to change the point group extraction condition is changed from the white line matching rate determination unit 107 shown in FIG. 3 to a white line type determination unit 111.

The white line type determination unit 111 is a unit for determining the type of a white line on a road existing near the own position of the own vehicle. The white line type determination may be performed through acquisition of type information about a white line prestored as map information in the high-accuracy map DB 151. When the map white line acquisition unit 104 acquires a white line position from the map information, the map white line acquisition unit 104 further acquires the type information about the white line, and the white line type determination unit 111 performs determination as to the type information. Another method for type determination may be as follows. That is, a white line type is identified on the basis of white line information detected by the sensor white line detection unit 101, and the white line type determination unit 111 performs determination as to the white line type on the basis of this information.

If a result of the determination as to the white line type indicates a white line type, the white line position of which is detected with high accuracy by the object detection sensor 211, such as a white line in the form of a dotted line or a single line, the distance range within which point groups are extracted from the white lines and which serves as a point group information extraction condition, is widened. Meanwhile, if the result indicates a white line type, the white line position of which is detected with low accuracy by the sensor, such as a white line with arrow feather marks, the distance range within which point groups are extracted from the white lines and which serves as a point group information extraction condition, is narrowed.

Figure 19:
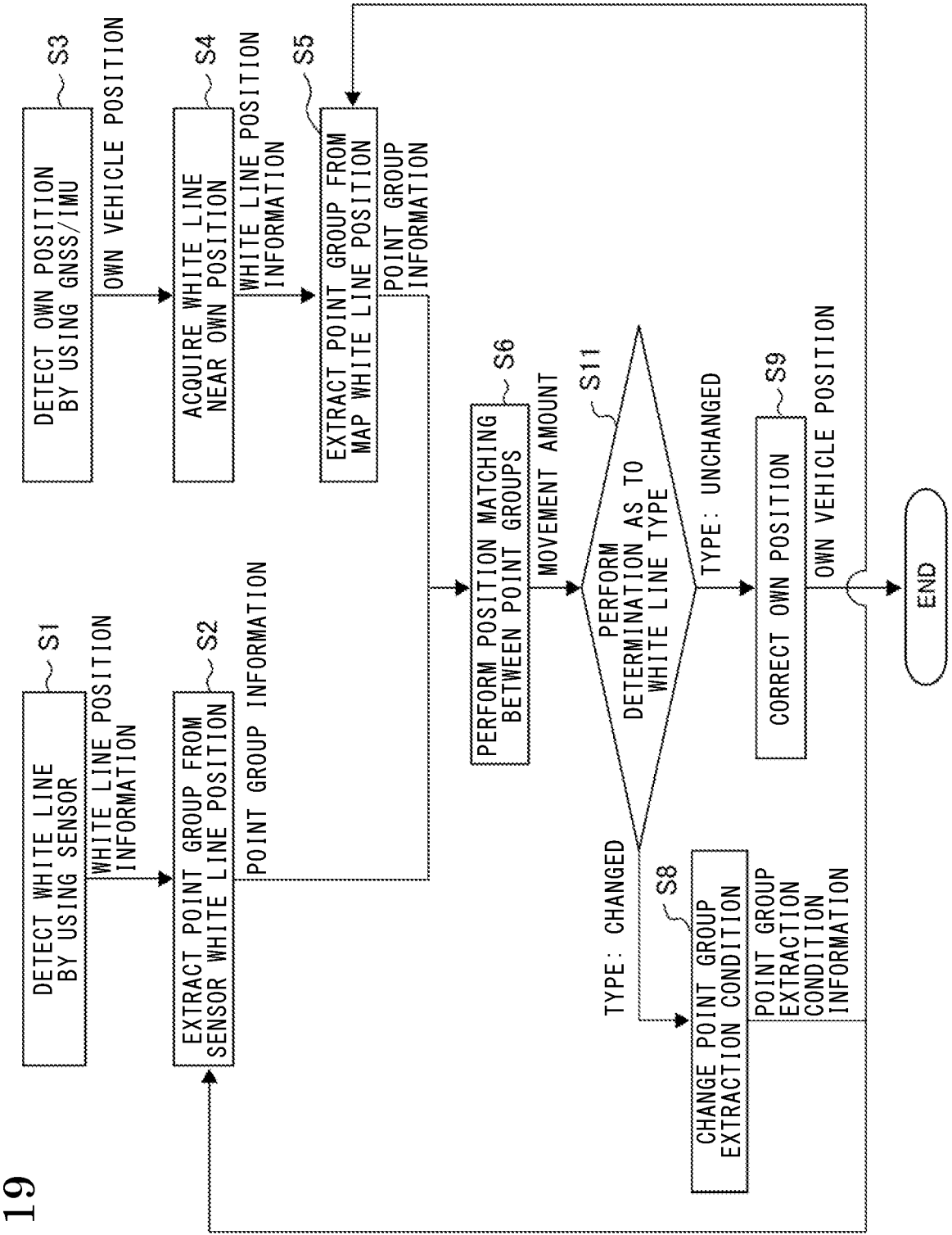
FIG. 19 is a flowchart for explaining an operation of the own position inferring device according to the third embodiment.

FIG. 19 shows a flowchart for carrying out the third embodiment. A difference from the first embodiment is that determination as to a white line type (step S11) is performed instead of determination as to the white line matching rate (step S7). The other processes are the same as those in the flowchart in FIG. 13.

The white line type determination unit 111 performs determination as to the type of the white line on the road existing near the own position of the own vehicle (step S11). For example, if the type of the white line has changed, e.g., if the white line near the own position has changed from a white line in the form of a single line to a white line with arrow feather marks, the point group extraction condition is changed (step S8). Meanwhile, if the type of the white line has not changed, the own position detected in step S3 is corrected by referring to the movement amount obtained through the position matching in step S6.

By the above process, the white line type determination unit 111 performs determination as to the type of the white line existing near the own position of the own vehicle, and the condition of extracting pieces of point group information for use in the process of position matching between the white line position from the object detection sensor 211 and the white line position on the map is changed according to a result of the determination. Thus, a process of position matching that exhibits robustness with respect to change in a travel environment is realized, and the own position of the own vehicle and a white line position existing at a long distance from the own vehicle are detected with high accuracy.

Fourth Embodiment

The present embodiment provides an own position inferring device in which the initial condition value for sensor point group extraction is changed according to specifications of the on-vehicle sensor. The accuracy of white line position detection varies depending on the specifications of the on-vehicle sensor. For example, a camera having a higher image resolution has a higher accuracy of white line position detection. Meanwhile, a camera having a wider angle of view for photographing has a lower accuracy of distant white line position detection. Considering this, the initial condition value according to which point group information is extracted from the white line position by the sensor point group extraction unit 102 is changed according to the specifications of the on-vehicle sensor such as the object detection sensor.

Figure 20:
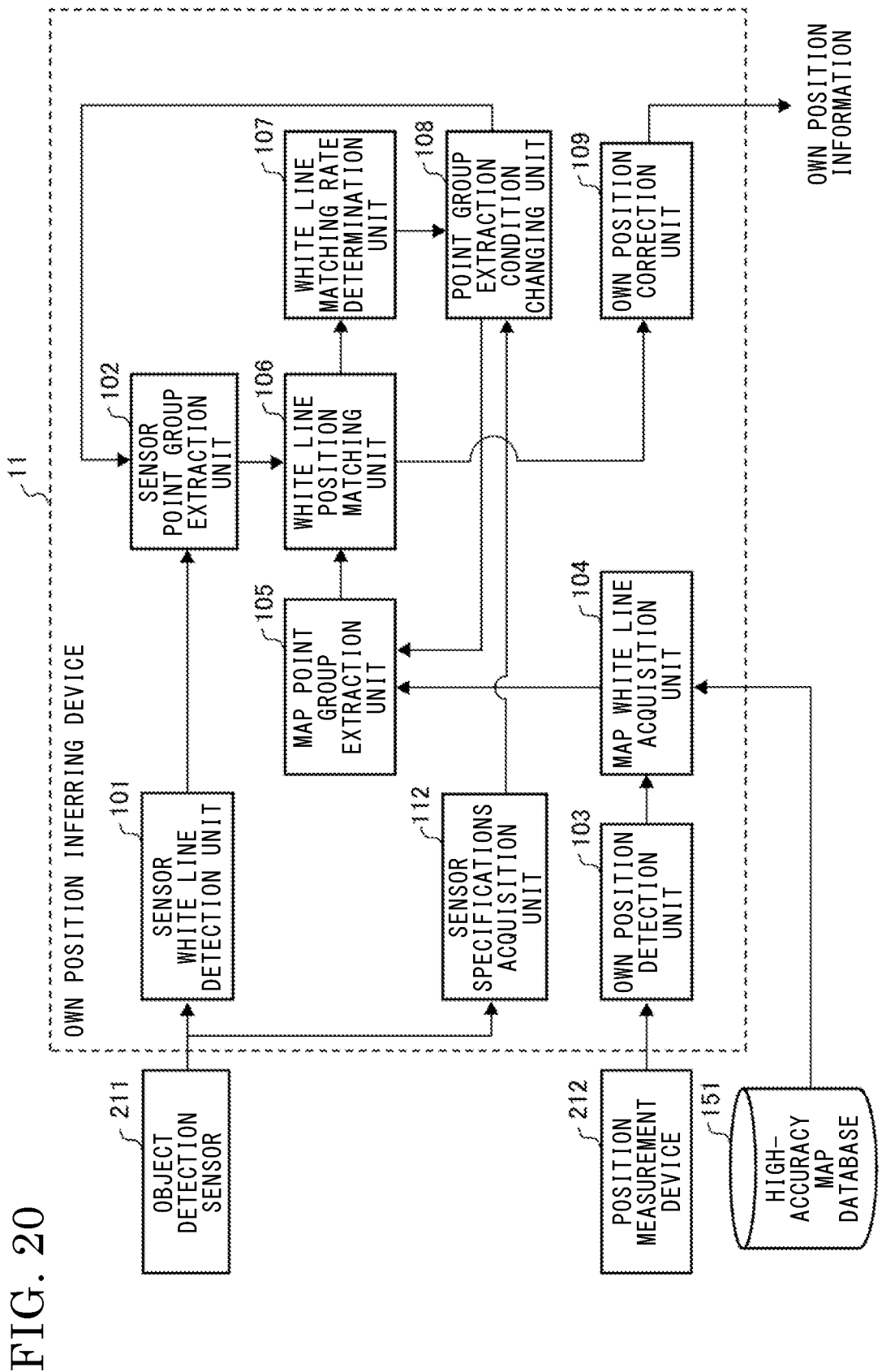
FIG. 20 is a functional configuration diagram of an own position inferring device according to a fourth embodiment.

FIG. 20 shows a functional configuration diagram of the fourth embodiment. A difference from the functions shown in FIG. 3 for the first embodiment is that a sensor specifications acquisition unit 112 is added.

The sensor specifications acquisition unit 112 acquires specifications information about the object detection sensor 211. For the sensor point group extraction unit 102, an initial condition of point group extraction is set on the basis of the specifications information about the object detection sensor 211 acquired by the sensor specifications acquisition unit 112. In the case of using a camera, information about an image resolution and the angle of view for photographing is acquired as sensor specifications information.

Figure 21:
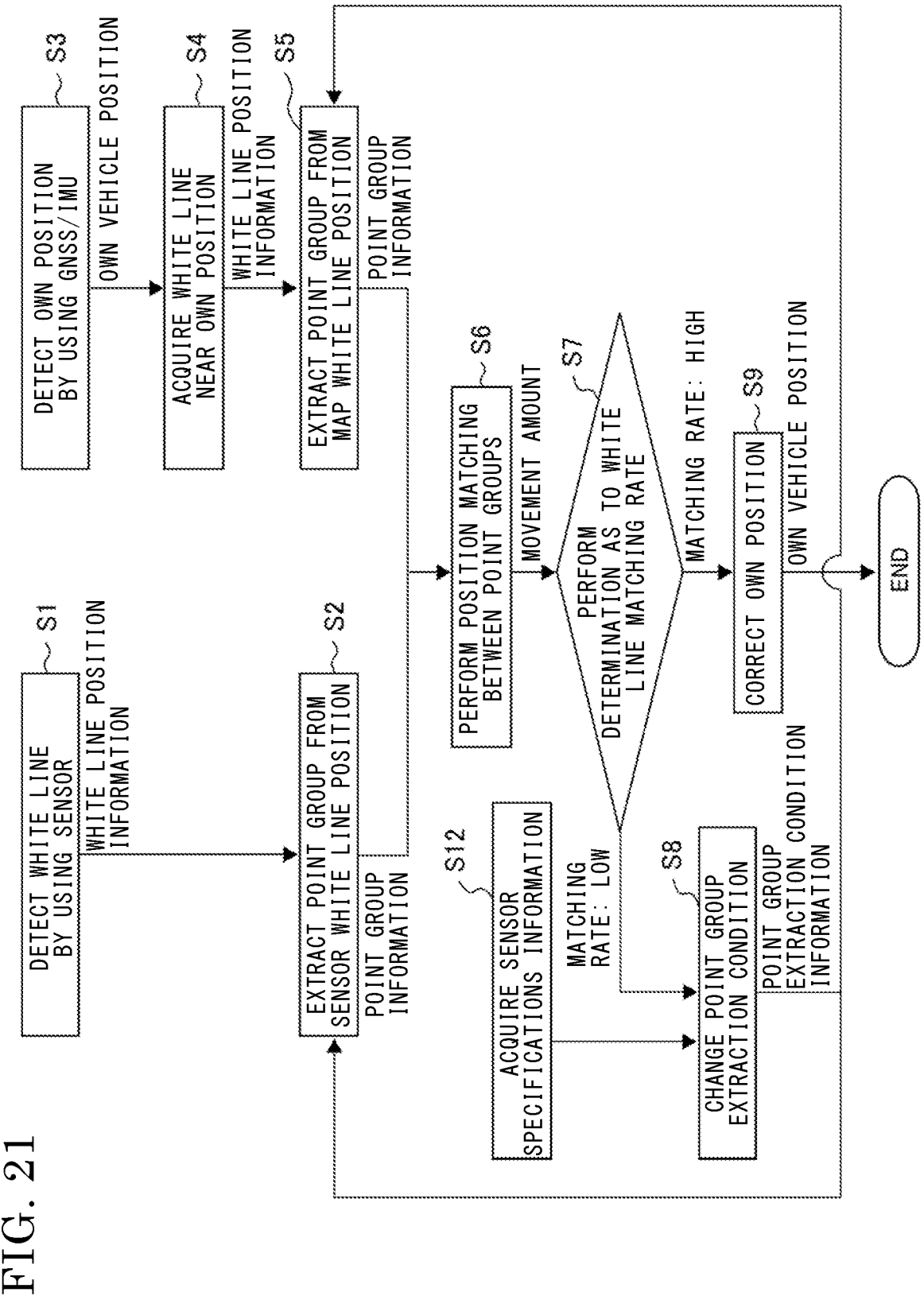
FIG. 21 is a flowchart for explaining an operation of the own position inferring device according to the fourth embodiment.

FIG. 21 shows a flowchart of the fourth embodiment. A difference from the first embodiment is that acquisition of sensor specifications information (step S12) is added as a processing step. The other processes are the same as those in the flowchart of the first embodiment.

The sensor specifications acquisition unit 112 acquires specifications information about the object detection sensor 211. For example, in the case of using a camera, an image resolution is acquired as specifications information. If the image resolution is equal to or lower than 1980×1020, the distance range within which pieces of point group information are extracted from the white line positions and which serves as an initial condition value for point group extraction, is set to 40 m. Meanwhile, if the image resolution is higher than 1980×1020, the distance range is set to 50 m. Pieces of point group information are extracted from the white line positions by referring to the set initial condition value for point group extraction (steps S2 and S5).

As described above, in the fourth embodiment, the condition of extracting pieces of point group information for use in the process of position matching between the white line position in the sensor point group information and the white line position in the map point group information is changed according to the specifications of the on-vehicle sensor represented by the object detection sensor 211. Thus, a process of position matching that exhibits robustness with respect to change in a travel environment is realized, and the own position of the own vehicle and a white line position existing at a long distance from the own vehicle are detected with high accuracy.

Fifth Embodiment

The present embodiment provides an own position inferring device in which white line detection reliability information prestored in the map information is acquired, and the condition of extracting pieces of point group information from the white line positions is changed by referring to the reliability information so that the point group information extraction condition is changed according to the travel environment.

Figure 22:
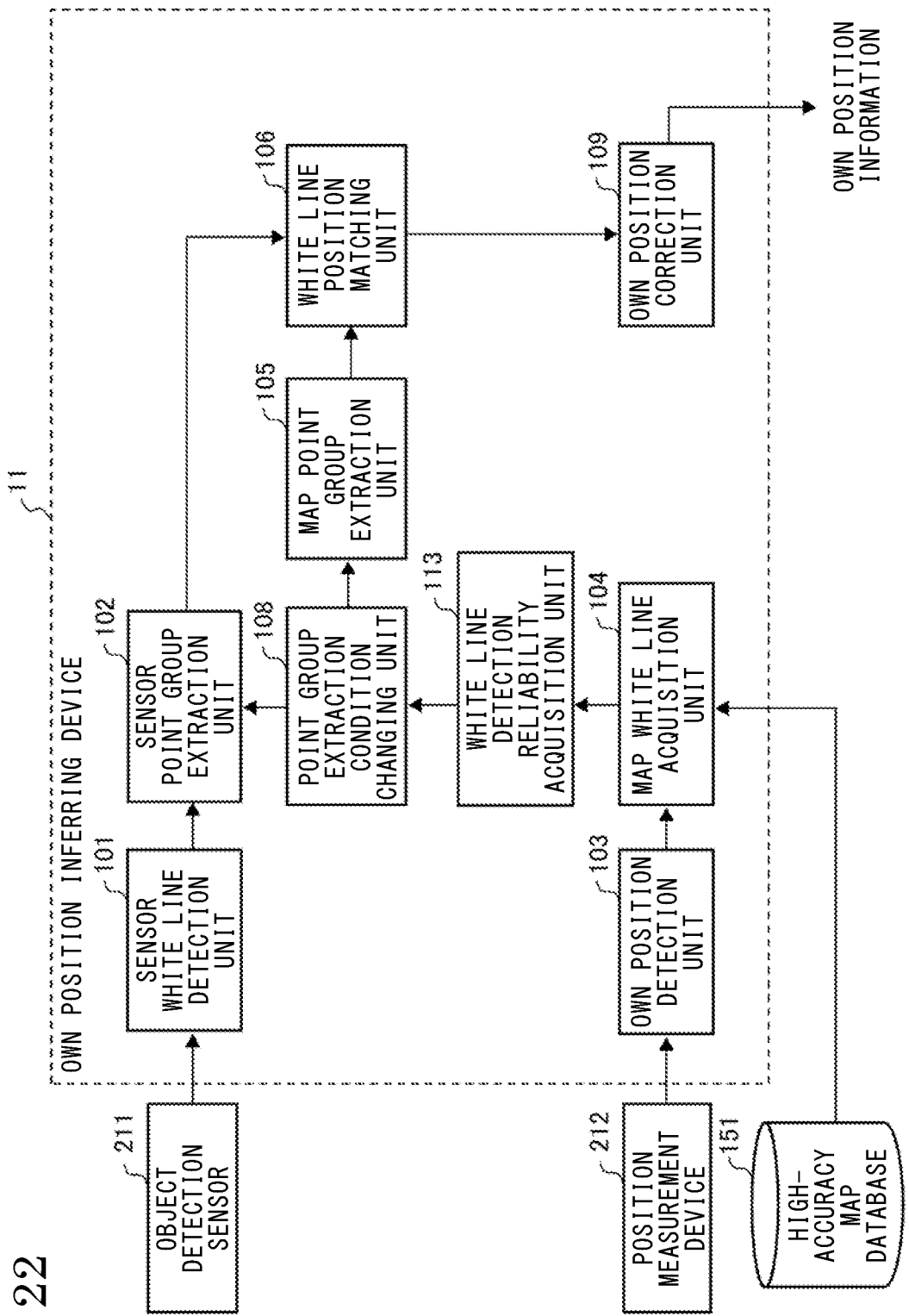
FIG. 22 is a functional configuration diagram of an own position inferring device according to a fifth embodiment.

FIG. 22 shows a functional configuration diagram of the fifth embodiment. A difference in configuration from the first embodiment is that the unit that forms the basis of determination to change the point group extraction condition is changed from the white line matching rate determination unit 107 shown in FIG. 3 to a white line detection reliability acquisition unit 113.

The white line detection reliability acquisition unit 113 acquires white line detection reliability information prestored in the map information in the high-accuracy map DB 151. A distance range from the own position of the own vehicle within which a white line position can be detected with high accuracy, may be researched on the basis of a white line detection result obtained in advance through measurement by the object detection sensor 211 and may be stored, and information about the distance range may be acquired as reliability information. The point group extraction condition changing unit 108 changes, according to the acquired information about the distance range, a condition as the distance range within which pieces of point group information are extracted from the white line positions.

Figure 23:
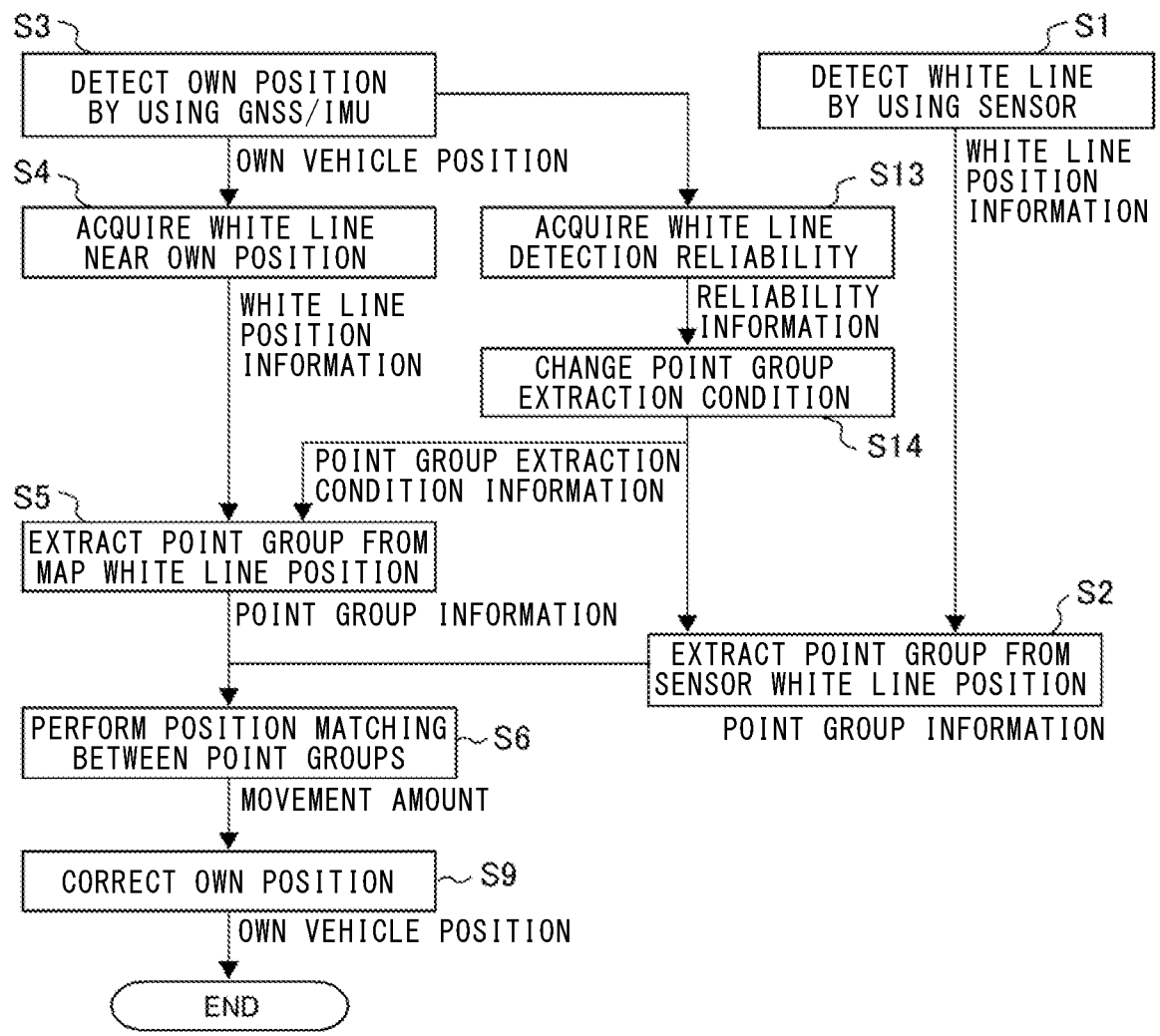
FIG. 23 is a flowchart for explaining an operation of the own position inferring device according to the fifth embodiment.

FIG. 23 shows a flowchart of the fifth embodiment. A difference from the first embodiment is that acquisition of white line detection reliability (step S13) is added as a processing step. Further, the point group extraction condition is changed according to reliability information acquired in the process of acquiring white line detection reliability (step S14). In addition, there is a difference also in that the process of determination as to the white line matching rate (step S7) described in the first embodiment is eliminated. The other processing steps are the same as the processes described in the flowchart of the first embodiment.

The white line detection reliability acquisition unit 113 acquires, from the map information, white line detection reliability information corresponding to a position near the own position detected (step S3) by the GNSS/IMU (step S13). The reliability information which is necessary for setting a point group extraction condition is preset in the map information. An example of the reliability information is distance range information or interval information for use in point group extraction. The condition of extracting pieces of point group information from the white line positions is changed by referring to either of these pieces of reliability information (step S14).

Figure 24:
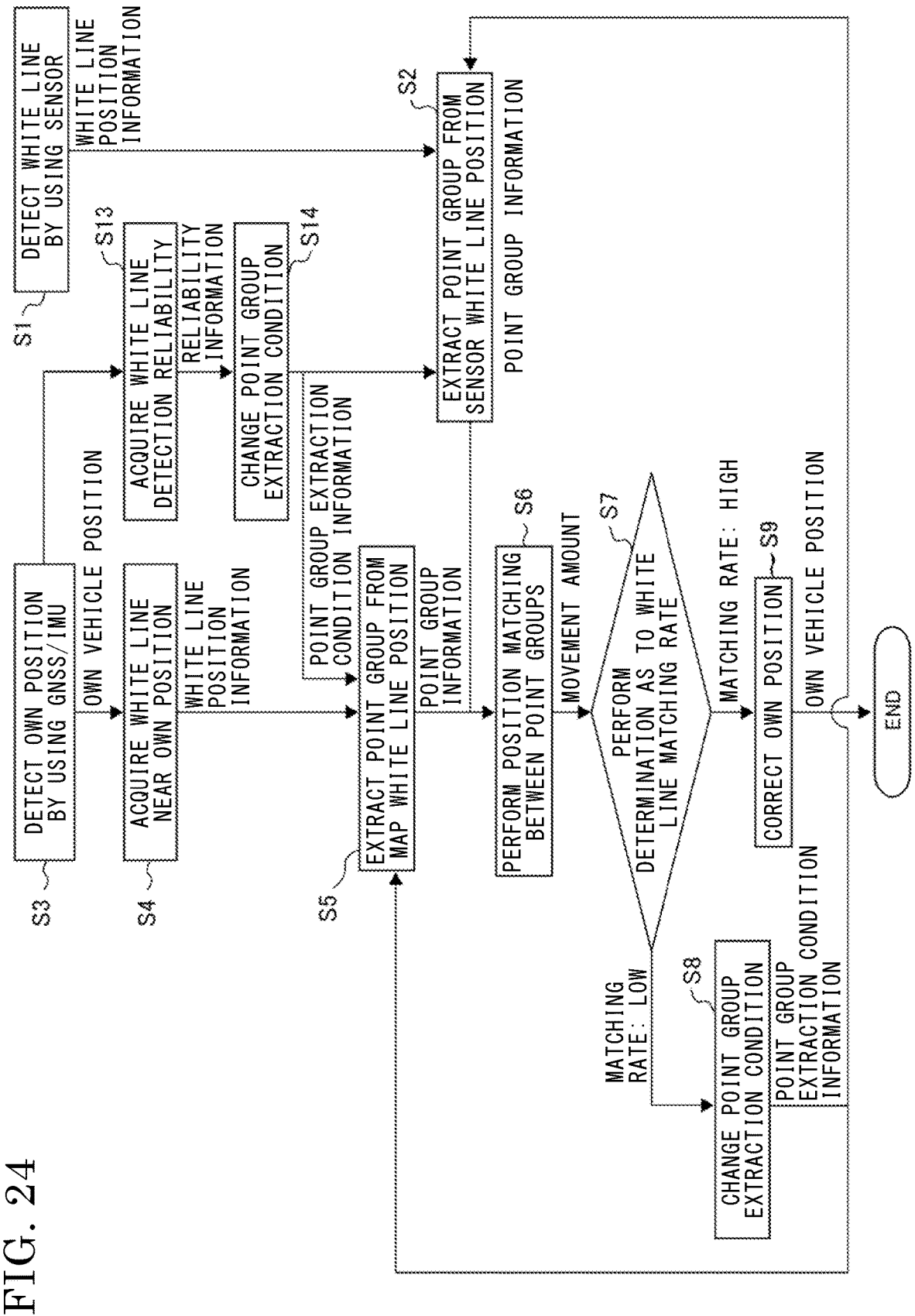
FIG. 24 is a flowchart for explaining another operation of the own position inferring device according to the fifth embodiment.

Although the process of determination as to the white line matching rate (step S7) is eliminated in the flowchart in FIG. 23, the process of determination as to the white line matching rate (step S7) may be added in addition to the acquisition of white line detection reliability information (step S13). FIG. 24 shows a flowchart in which the process of determination as to the white line matching rate (step S7) has been added.

In the flowchart in FIG. 24, the process of determination as to the white line matching rate (step S7) and the process of changing the point group extraction condition (step S8) are added unlike in FIG. 23. In FIG. 23, the point group extraction condition is changed on the basis of the white line detection reliability information acquired from the map information (step S14). Meanwhile, the process of position matching between the point groups may be performed thereafter (step S6), the result of the process may be used to perform the process of determination as to the white line matching rate (step S7), and the point group extraction condition may be changed again (step S8).

It is noted that, although FIG. 23 and FIG. 24 each show a method in which the reliability information preset in the map information is acquired as white line detection reliability information, reliability information outputted by the on-vehicle sensor 21 may be acquired instead of acquiring reliability information from the map information. If reliability information outputted by the object detection sensor takes a large value, the distance range within which pieces of point group information are extracted from the white line positions may be widened. Meanwhile, if the reliability information takes a small value, the distance range may be narrowed.

By the processes in the above flowcharts, the condition of extracting pieces of point group information for use in the process of position matching between the white line position from the on-vehicle sensor and the white line position on the map is changed by referring to the white line detection reliability information preset in the map information. Thus, a process of position matching that exhibits robustness with respect to change in travel road position is realized, and the own position of the own vehicle and a white line position existing at a long distance from the own vehicle are detected with high accuracy.

Sixth Embodiment

The present embodiment provides an own position inferring device in which the condition of acquiring pieces of point group information from the white line positions is changed according to a travel state of the own vehicle so that the point group information extraction condition is changed according to the travel environment. In general, during high-speed travel of the own vehicle or during travel of the own vehicle on a curved road, the accuracy of white line position detection by the object detection sensor 211 decreases. Considering this, the point group acquisition condition is changed according to the travel condition of the own vehicle.

Figure 25:
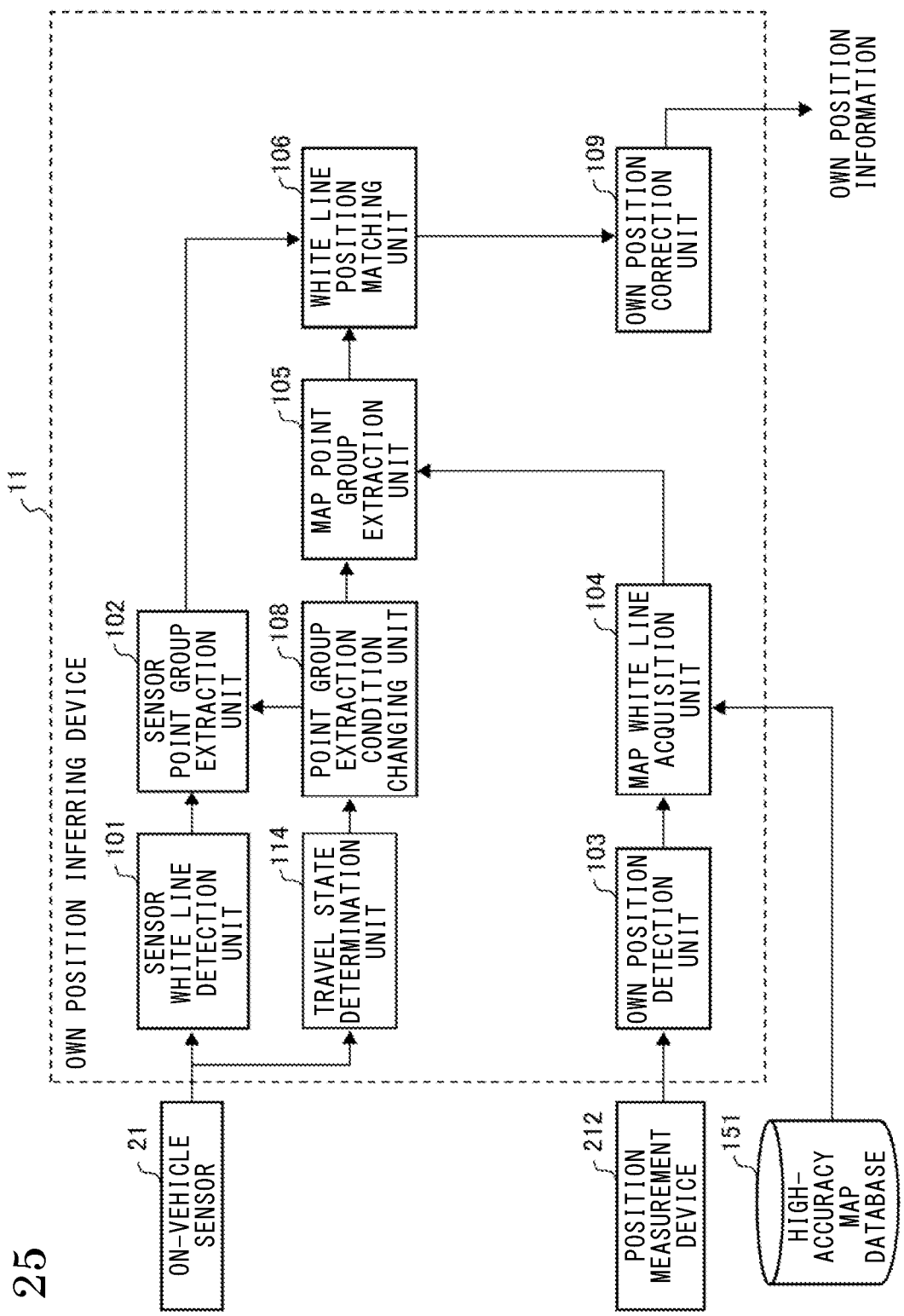
FIG. 25 is a functional configuration diagram of an own position inferring device according to a sixth embodiment.

FIG. 25 shows a functional configuration diagram of the sixth embodiment. A difference from the fifth embodiment is that the white line detection reliability acquisition unit 113 in the fifth embodiment is changed to a travel state determination unit 114.

The travel state determination unit 114 determines a travel state of the own vehicle. Examples of the travel state are the acceleration, the speed, and the yaw rate of the own vehicle. On the basis of the acceleration and the speed of the own vehicle, a situation in which the accuracy of white line position detection during high-speed travel decreases is inferred, and the distance range for point group extraction is adjusted. Meanwhile, on the basis of the yaw rate of the own vehicle, a situation in which the accuracy of white line position detection during travel on a curved road decreases is inferred, and the distance range for point group extraction is adjusted.

During travel at night, information about switching between low beam and high beam of a headlight or information about ON and OFF of a fog lamp may be added to the travel state. If the setting of the headlight is changed to high beam, the accuracy of detecting a white line position existing at a long distance from the own vehicle is improved. Considering this, the distance range within which pieces of point group information are acquired from the white line positions is widened in the case of high beam, and the distance range is narrowed in the case of low beam. Further, if the fog lamp is turned on, a taken image showing a road surface existing at a short distance from the own vehicle experiences halation, and the accuracy of detecting a white line position existing at a short distance decreases. Considering this, when the fog lamp is turned on, setting may be performed such that, for example, a white line position existing at a distance of up to 10 m from the own vehicle is excluded from the distance range for point group extraction at the time of extraction of pieces of point group information from the white line positions.

Figure 26:
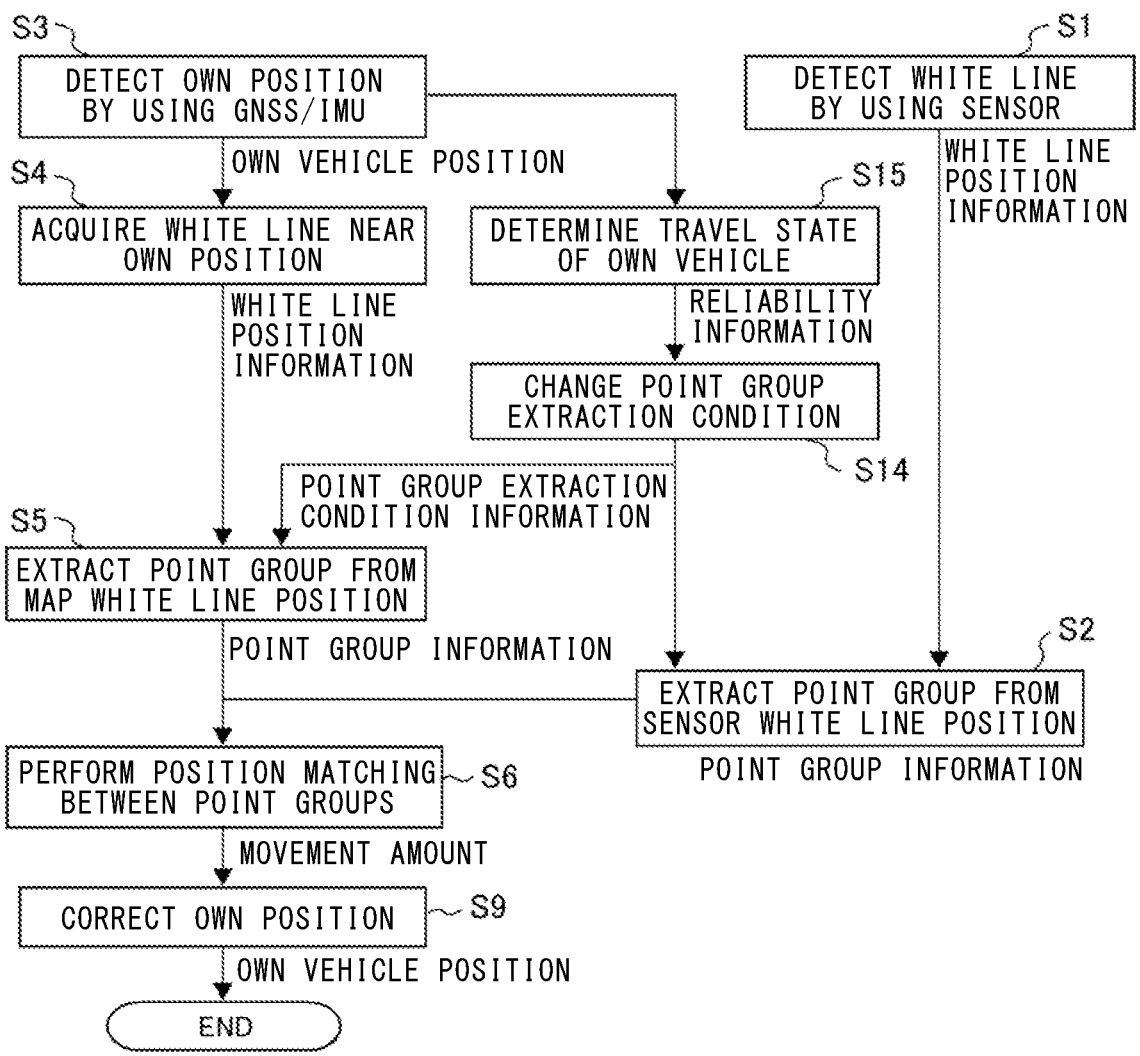
FIG. 26 is a flowchart for explaining an operation of the own position inferring device according to the sixth embodiment.

FIG. 26 shows a flowchart of the sixth embodiment. A difference from the fifth embodiment is that the process of acquiring white line detection reliability information (step S13) is changed to a process of determining a travel state of the own vehicle (step S15). The other processing steps are the same as those in the flowchart of the fifth embodiment. In the present embodiment as well, the process of determination as to the white line matching rate (step S7) may be added in the same manner as in the flowchart in FIG. 24.

The travel state determination unit 114 acquires travel information about the own vehicle from the on-vehicle sensor 21 and determines a travel state (step S15). For example, information about the curvature of a curved road on which the own vehicle is traveling is determined on the basis of a yaw rate acquired from the on-vehicle sensor 21. By referring to the result of determining the information about the curvature, the accuracy of white line position detection is determined, and the condition of extracting pieces of point group information from the white line positions is changed (step S14).

By the processes of the above flowchart, the condition of extracting pieces of point group information for use in the process of position matching between the white line position from the object detection sensor 211 and the white line position on the map is changed according to the travel state of the own vehicle. Thus, a process of position matching that exhibits robustness with respect to change in the travel state of the own vehicle is realized, and the own position of the own vehicle and a white line position existing at a long distance from the own vehicle are detected with high accuracy.

Seventh Embodiment

The present embodiment provides an own position inferring device in which a white line position existing near any of obstacles such as another vehicle and a pedestrian detected by the object detection sensor 211 is excluded from the point group information extraction range so that the point group information extraction condition is changed according to the travel environment. The point group information extraction condition is changed since: a white line on the road is hidden by the obstacle; and the accuracy of white line position detection is decreased by the shade of the obstacle.

Figure 27:
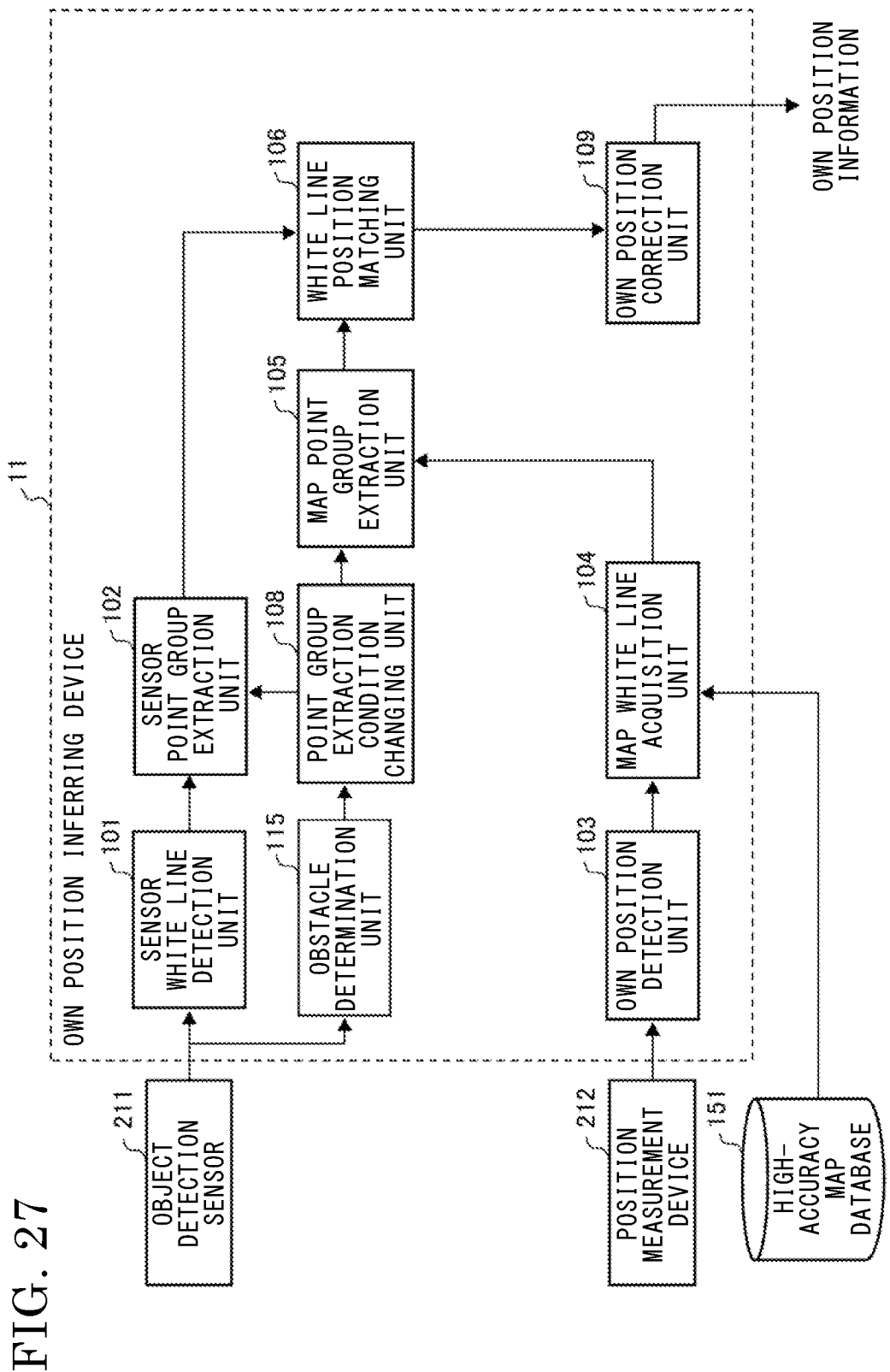
FIG. 27 is a functional configuration diagram of an own position inferring device according to a seventh embodiment.
Figure 28:
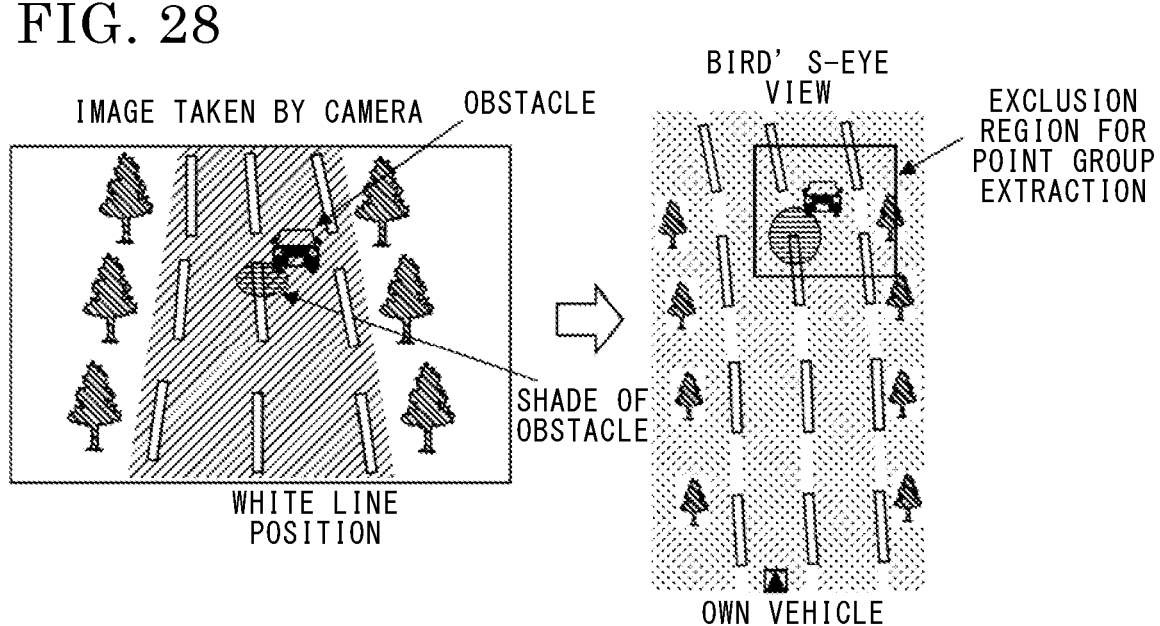
FIG. 28 is a diagram for explaining obstacle determination in the seventh embodiment.

FIG. 27 shows a functional configuration diagram of the seventh embodiment. An obstacle determination unit 115 determines whether or not there is any obstacle near the own vehicle. In addition, the obstacle determination unit 115 detects information about the size of the obstacle and determines a range in which the obstacle hides a white line on the road. FIG. 28 shows an example of the obstacle determination unit 115 in the case of using a camera as the object detection sensor 211. In an image taken by the camera in FIG. 28, another vehicle as an obstacle is shown, and the brightness value of a part of a white line is decreased by the shade of the other vehicle. If the brightness value of a part of a white line is changed by influence of another vehicle or the like in this manner, the accuracy of white line position detection at the part decreases. Considering this, the obstacle determination unit 115 determines, as an exclusion region for point group extraction, an image region existing near any of obstacles such as another vehicle and a pedestrian detected by the object detection sensor 211 such that no point group information is extracted from the white line position in the image region. The size of the exclusion region may be changed according to the type and the size of the obstacle. Specifically, if the obstacle is a pedestrian, a 2-m square around the pedestrian may be determined as the size of the exclusion region, and, if the obstacle is another vehicle, a 5-m square around the other vehicle may be determined as the size of the exclusion region.

Figure 29:
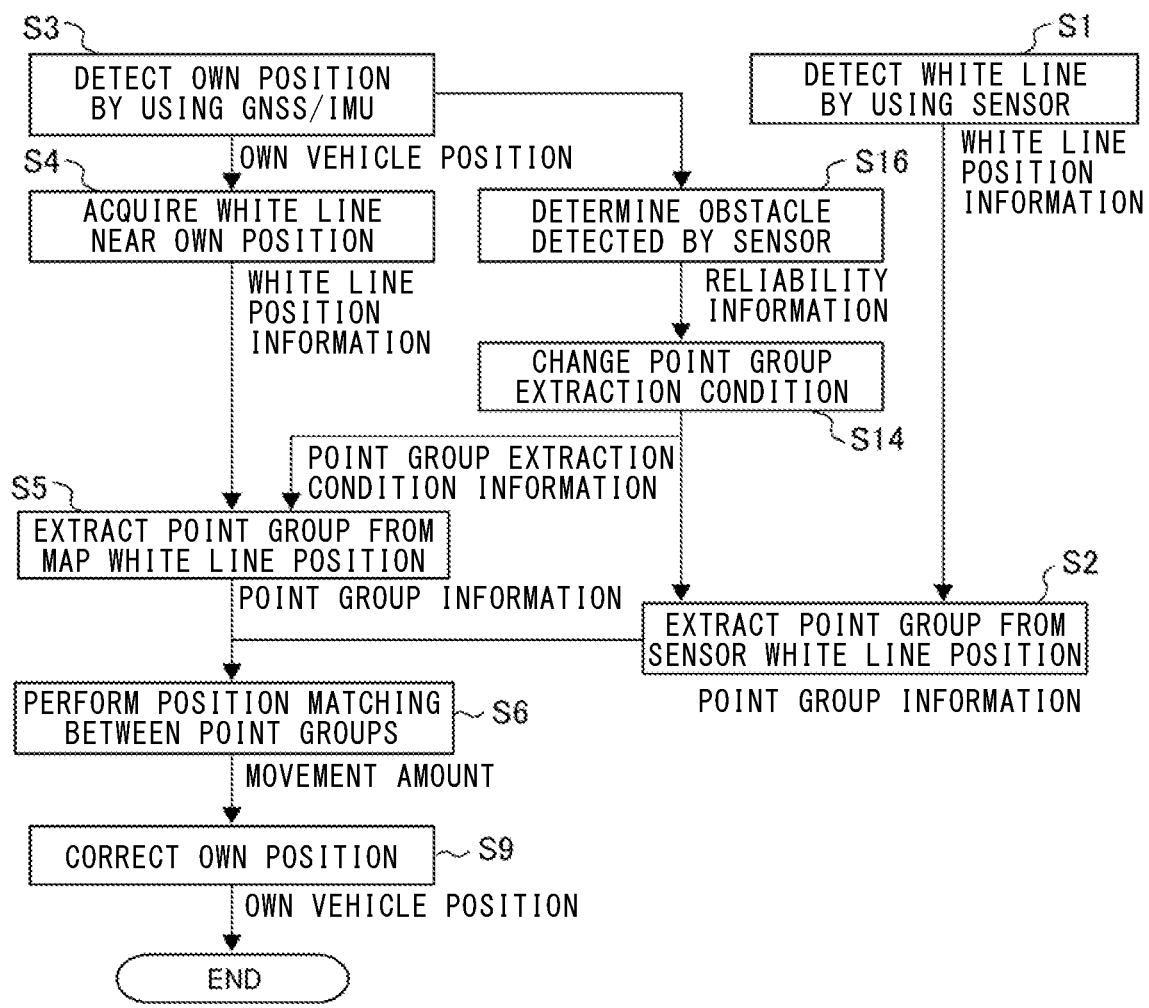
FIG. 29 is a flowchart for explaining an operation of the own position inferring device according to the seventh embodiment.

FIG. 29 shows a flowchart of the seventh embodiment. A difference from the fifth embodiment is that the process of acquiring white line detection reliability information (step S13) is substituted with a process of determining an obstacle detected by the object detection sensor 211 (step S16). The other processing steps are the same as those in the flowchart of the fifth embodiment. In the present embodiment as well, the process of determination as to the white line matching rate (step S7) may be added in the same manner as in the flowchart in FIG. 24.

The obstacle determination unit 115 determines a position of an obstacle existing near the own vehicle by using the object detection sensor 211. In addition, a type of the obstacle is determined, and an exclusion region is set such that no point group information is extracted from a white line position existing in a region near the obstacle (step S16). The point group information extraction condition is changed such that point group information is extracted from a white line position existing in a region other than the exclusion region having been set (step S14).

In the seventh embodiment, by the processes of the above flowchart, the condition of extracting pieces of point group information for use in the process of position matching between the white line position from the on-vehicle sensor and the white line position on the map is changed in consideration of decrease in the accuracy of white line position detection due to an obstacle. Thus, a process of position matching that exhibits robustness with respect to change in the travel state of the own vehicle is realized, and the own position of the own vehicle and a white line position existing at a long distance from the own vehicle are detected with high accuracy.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 11 own position inferring device
12 sensor IO device
13 CPU
14 RAM
15 ROM
21 on-vehicle sensor
31 vehicle control unit
101 sensor white line detection unit
102 sensor point group extraction unit
103 own position detection unit
104 map white line acquisition unit
105 map point group extraction unit
106 white line position matching unit
107 white line matching rate determination unit
108 point group extraction condition changing unit
109 own position correction unit
110 sensor change amount determination unit
111 white line type determination unit
112 sensor specifications acquisition unit
113 white line detection reliability acquisition unit
114 travel state determination unit
115 obstacle determination unit
211 object detection sensor
212 position measurement device

What is claimed is:
1. An own position inferring device comprising:
a sensor white line detector to detect a white line position on the basis of an output from an on-vehicle sensor;

a sensor point group extractor to extract first point group information from the white line position detected by the sensor white line detector;

an own position detector to measure an own position on the basis of an output from a position measurement device;

a map white line acquisition circuitry to acquire a white line position from map information about a region around the own position detected by the own position detector;

a map point group extraction circuitry to extract second point group information from the white line position acquired from the map information by the map white line acquisition circuitry;

a point group extraction condition changer to change a point group extraction condition for the sensor point group extraction unit and the map point group extractor;

a white line position matching circuitry to perform position matching between the first point group information extracted by the sensor point group extractor and the second point group information extracted by the map point group extractor; and an own position corrector to correct the own position on the basis of a result of the position matching circuitry performed by the white line position matching circuitry.

2. The own position inferring device according to claim 1, further comprising a white line matching rate determinator to perform determination as to a matching rate between the first point group information and the second point group information which have been subjected to the position matching by the white line position matching circuitry, wherein the point group extraction condition changer changes the point group extraction condition on the basis of a result of the determination performed by the white line matching rate determinator.

3. The own position inferring device according to claim 1, further comprising a sensor change amount determinator to perform determination as to an amount of change in measurement data from the on-vehicle sensor, wherein if the amount of the change is determined to be larger than a predetermined threshold value, the point group extraction condition changer changes the point group extraction condition.

4. The own position inferring device according to claim 1, further comprising a white line type determinator to perform determination as to a white line type, wherein the point group extraction condition changes the point group extraction condition on the basis of the white line type.

5. The own position inferring device according to claim 1, further comprising a sensor specifications acquisition circuitry to acquire sensor specifications information about the on-vehicle sensor, wherein the point group extraction condition changer changes the point group extraction condition on the basis of the sensor specifications information.

6. The own position inferring device according to claim 1, further comprising a white line detection reliability acquisition circuitry to acquire reliability information, about white line detection, which is prestored in the map information, wherein the point group extraction condition changer changes the point group extraction condition on the basis of the reliability information.

7. The own position inferring device according to claim 1, further comprising a white line detection reliability acquisition circuitry to acquire reliability information, about white line detection, which has been detected by the on-vehicle sensor and which has been prestored, wherein the point group extraction condition changer changes the point group extraction condition on the basis of the reliability information.

8. The own position inferring device according to claim 1, further comprising an obstacle determinator to determine, on the basis of an output from the on-vehicle sensor, whether or not there is any obstacle, wherein the point group extraction condition changes the point group extraction condition on the basis of a result of the determination performed by the obstacle determinator.

9. The own position inferring device according to claim 1, further comprising a travel state determinator to determine a travel state, of a vehicle, that has been measured by the on-vehicle sensor, wherein the point group extraction condition changer changes the point group extraction condition on the basis of a result of the determination performed by the travel state determinator.

10. The own position inferring device according to claim 1, wherein the on-vehicle sensor is an object detection sensor.

11. The own position inferring device according to claim 1, wherein the point group extraction condition changer changes a region in which pieces of point group information are extracted from the white line positions.

12. The own position inferring device according to claim 1, wherein the point group extraction condition changer changes an extraction density at which pieces of point group information are extracted from the white line positions.

* * * * *